(12) United States Patent
Irikura et al.

(10) Patent No.: US 7,690,469 B2
(45) Date of Patent: *Apr. 6, 2010

(54) CENTRAL DIFFERENTIAL FOR A WORKING VEHICLE

(75) Inventors: Koji Irikura, Morristown, TN (US); Donald Wieber, Bean Station, TN (US)

(73) Assignee: Kanzaki Kokyukoki Mfg. Co., Ltd. (JP)

( * ) Notice: Subject to any disclaimer, the term of this patent is extended or adjusted under 35 U.S.C. 154(b) by 293 days.

This patent is subject to a terminal disclaimer.

(21) Appl. No.: 11/684,300

(22) Filed: Mar. 9, 2007

(65) Prior Publication Data

US 2007/0163854 A1 Jul. 19, 2007

Related U.S. Application Data

(63) Continuation-in-part of application No. 11/277,433, filed on Mar. 24, 2006, now Pat. No. 7,490,708, which is a continuation-in-part of application No. 11/090,097, filed on Mar. 28, 2005, now Pat. No. 7,493,998.

(51) Int. Cl.
    *B60K 17/344* (2006.01)
(52) U.S. Cl. .......................... 180/248; 192/38; 74/650
(58) Field of Classification Search .................. 180/248
    See application file for complete search history.

(56) References Cited

U.S. PATENT DOCUMENTS

| | | | | |
|---|---|---|---|---|
| 1,175,300 A | * | 3/1916 | Ross | 74/650 |
| 2,191,763 A | * | 2/1940 | La Casse | 74/650 |
| 2,210,997 A | * | 8/1940 | Anderson | 330/90 |
| 2,481,066 A | * | 9/1949 | Walter | 74/650 |
| 3,173,309 A | * | 3/1965 | Seliger | 74/650 |
| 3,310,997 A | * | 3/1967 | Biddle | 74/650 |
| 3,447,396 A | * | 6/1969 | Seliger | 74/650 |
| 3,472,349 A | * | 10/1969 | Ainsworth | 192/35 |
| 3,581,597 A | * | 6/1971 | Reiersgaard | 74/650 |
| 3,700,082 A | * | 10/1972 | Schwab | 192/50 |
| 3,935,753 A | * | 2/1976 | Williams | 74/650 |
| 4,373,407 A | * | 2/1983 | Okubo | 74/650 |
| 4,434,878 A | * | 3/1984 | Okubo | 192/48.92 |
| 4,876,918 A | | 10/1989 | Hudson | |
| 5,971,123 A | | 10/1999 | Ochab et al. | |
| 6,516,688 B2 | | 2/2003 | Albertson | |
| 6,629,590 B2 | | 10/2003 | Ochab et al. | |
| 6,655,515 B2 | | 12/2003 | Cox et al. | |

(Continued)

OTHER PUBLICATIONS

European Search Report for European Application No. EP 06 25 1647, dated Jun. 30, 2006.

*Primary Examiner*—Lesley Morris
*Assistant Examiner*—Tashiana Adams
(74) *Attorney, Agent, or Firm*—Sterne, Kessler, Goldstein & Fox P.L.L.C.

(57) ABSTRACT

Presented herein are four-wheel drive systems incorporating a bi-directional overrunning clutch design to control the torque transmission between front and rear transaxles. In accordance with one aspect of the present invention, there is provided a four-wheel drive system comprising a front transaxle, a rear transaxle, a transmission receiving drive power from a prime mover, and a bi-directional overrunning clutch drivingly coupled to an output shaft of the transmission and selectively coupled to the front and rear transaxle.

20 Claims, 34 Drawing Sheets

U.S. PATENT DOCUMENTS 6,722,484 B2 4/2004 Ochab et al.
2003/0089570 A1 5/2003 Ochab et al.
2009/0011890 A1 1/2009 Bawks

* cited by examiner

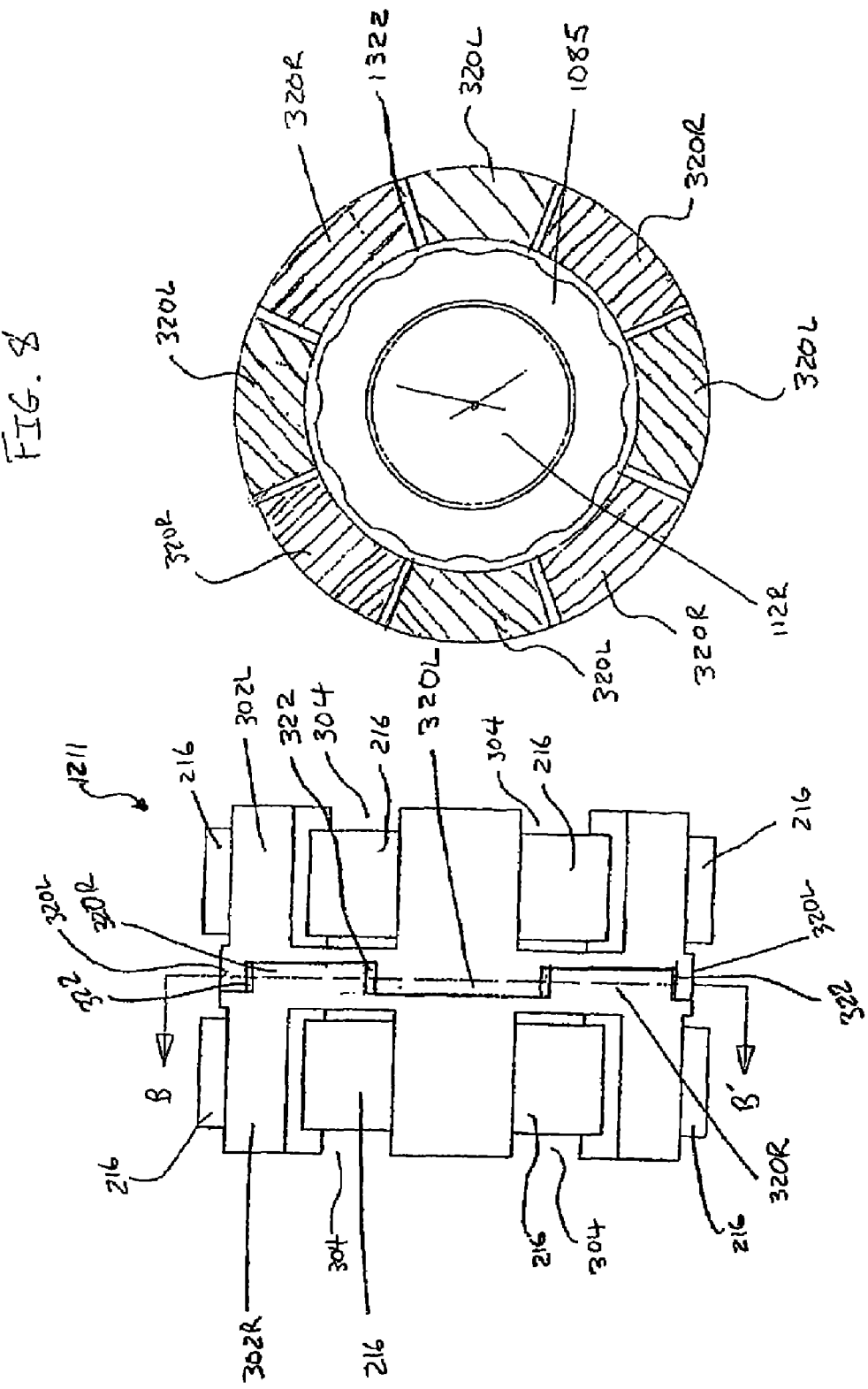

CENTRAL DIFFERENTIAL FOR A WORKING VEHICLE

CROSS REFERENCE TO RELATED APPLICATIONS

The present application is a Continuation-in-Part of U.S. patent application Ser. No. 11/277,433, filed Mar. 24, 2006, which is a Continuation-in-Part of U.S. patent application Ser. No. 11/090,097, filed Mar. 28, 2005, the disclosures of which are incorporated herein in their entirety by reference thereto.

BACKGROUND OF THE INVENTION

1. Field of the Invention

The present invention is related to clutches, and more particularly to a bi-directional overrunning clutch for controlling torque transmission to primary drive axles of a working vehicle.

2. Background Art

Simple drive systems for two wheel drive working vehicles, i.e. lawn mowers, lawn vacuums, snow blowers, utility tractors, trimmers, edgers, concrete and asphalt cutters, and the like, typically include a drive shaft or belt connected to a single drive axle, which drives both drive wheels. The principal deficiency with this type of drive system is that the vehicle is inefficient during turning because the wheels rotate on a common shaft, and thus rotate at the same rate of speed.

For instance, when turning such a vehicle, the outer wheel must travel a greater distance than the inner wheel in the same amount of time. However, because the wheels rotate on a common shaft, the result is that differential rotation is not permitted, resulting in one of the wheels slipping or skidding. This slipping/skidding results in premature wear of the wheel, and damage to surfaces on which the vehicle is operating. A lawn mower with this type of drive system can damage the turf under the slipping wheel. Similar inefficiencies are known to four-wheel drive vehicles when traveling on unleveled surfaces, resulting in slipping/skidding of the front or rear axles.

To eliminate the inefficiency in two-wheel drive systems, vehicles are generally provide with a differential between the pair of drive wheels. The differential permits independent or differential rotation of the drive wheels on an axle when the vehicle turns. Differentials, however, have various disadvantages. For example, when one wheel losses traction with the ground, the conventional differential is unable to transmit torque to the opposite wheel. To address this problem, many differentials on the market today use some form of overrunning clutch, or differential lock, to transmit torque when needed to a driven shaft. Co-pending and co-owned U.S. patent application Ser. Nos. 11/090,097 and 11/277,433 describe various bi-directional overrunning clutch designs for controlling torque transmission between two axle shaft segments in a transaxle. Application Ser. Nos. 11/090,097 and 11/277,433 are hereby incorporated in their entirety by reference thereto. What is needed is a bi-directional overrunning clutch suited for transmission of torque between front and rear drive axles in a four-wheel drive system.

SUMMARY OF THE INVENTION

Presented herein are four-wheel drive systems incorporating a bi-directional overrunning clutch design to control the torque transmission between front and rear transaxles. In accordance with one aspect of the present invention, there is provided a four-wheel drive system comprising a front transaxle, a rear transaxle, a transmission receiving drive power from a prime mover, and a bi-directional overrunning clutch drivingly coupled to an output shaft of the transmission and selectively coupled to the front and rear transaxle. The bi-directional overrunning clutch includes an input gear drivingly coupled to the output shaft of the transmission and a roller assembly disposed within the input gear. The roller assembly includes a roll cage, and a spring extending from the roll cage. The bi-directional overrunning clutch also includes a first hub located at least partially within the roller assembly and selectively coupled to an end of a forward shaft segment, wherein the forward shaft segment delivers torque to the front transaxle. The bi-directional overrunning clutch also includes a second hub located at least partially within the roller assembly and coupled to an end of a rearward shaft segment, wherein the rearward shaft segment delivers torque to the rear transaxle. The bi-directional overrunning clutch further includes a friction member, such as a friction plate, O-ring, or ball-lock member, disposed adjacent the roller assembly and at least one of the hubs. The spring extending from the roller assembly exerts a force on the friction member, thereby creating a frictional engagement between the roller assembly and the hub.

In accordance with one aspect of the present invention, the roll cage may be divided into two distinct roll cage segments, which are interlocked with one another in a loose-fitting engagement. Each roll cage segment includes a plurality of recesses. A plurality of rollers may then be disposed within the recesses of the roll cage segments. Further, each hub includes a plurality of detents that engage with the rollers.

In accordance with another aspect of the present invention, there is provided a clutch slider in splined engagement with the forward or rearward shaft segment. The clutch slider may be set in one of two settings. The first setting is a disengaged setting to allow the bi-directional overrunning clutch to perform its differential function of differentially transmitting torque to the shaft segment. The second setting is an engaged setting to lock the shaft segment to the input gear and thereby cancel the differential function.

In accordance with another aspect of the present invention, there is provided a clutch slider disposed about the forward or rearward shaft segment. The clutch slider may be set in one of three settings. The first setting is a disengaged setting to allow the bi-directional overrunning clutch to perform its differential function of differentially transmitting torque to the shaft segment. The second setting is an engaged setting to lock the shaft segment to the input gear and thereby cancel the differential function. The third setting is a neutral setting which decouples the shaft segment from the bi-directional overrunning clutch, thereby preventing the transmission of torque from the bi-directional overrunning clutch to the shaft segment.

In one embodiment, the transmission and the bi-directional overrunning clutch are disposed within one integral housing. In an alternative embodiment, the transmission, bi-directional overrunning clutch, and rear transaxle are all disposed within one integral housing. The front and rear transaxles may each include their own bi-directional overrunning clutch to transmit torque to their respective axle shaft segments.

BRIEF DESCRIPTION OF THE DRAWINGS/FIGURES

The accompanying drawings, which are incorporated herein and form part of the specification, illustrate a bi-directional overrunning clutch and, together with the description, further serve to describe and enable a person skilled in the relevant art to make and use such a bi-directional overrunning clutch.

Figure 5:
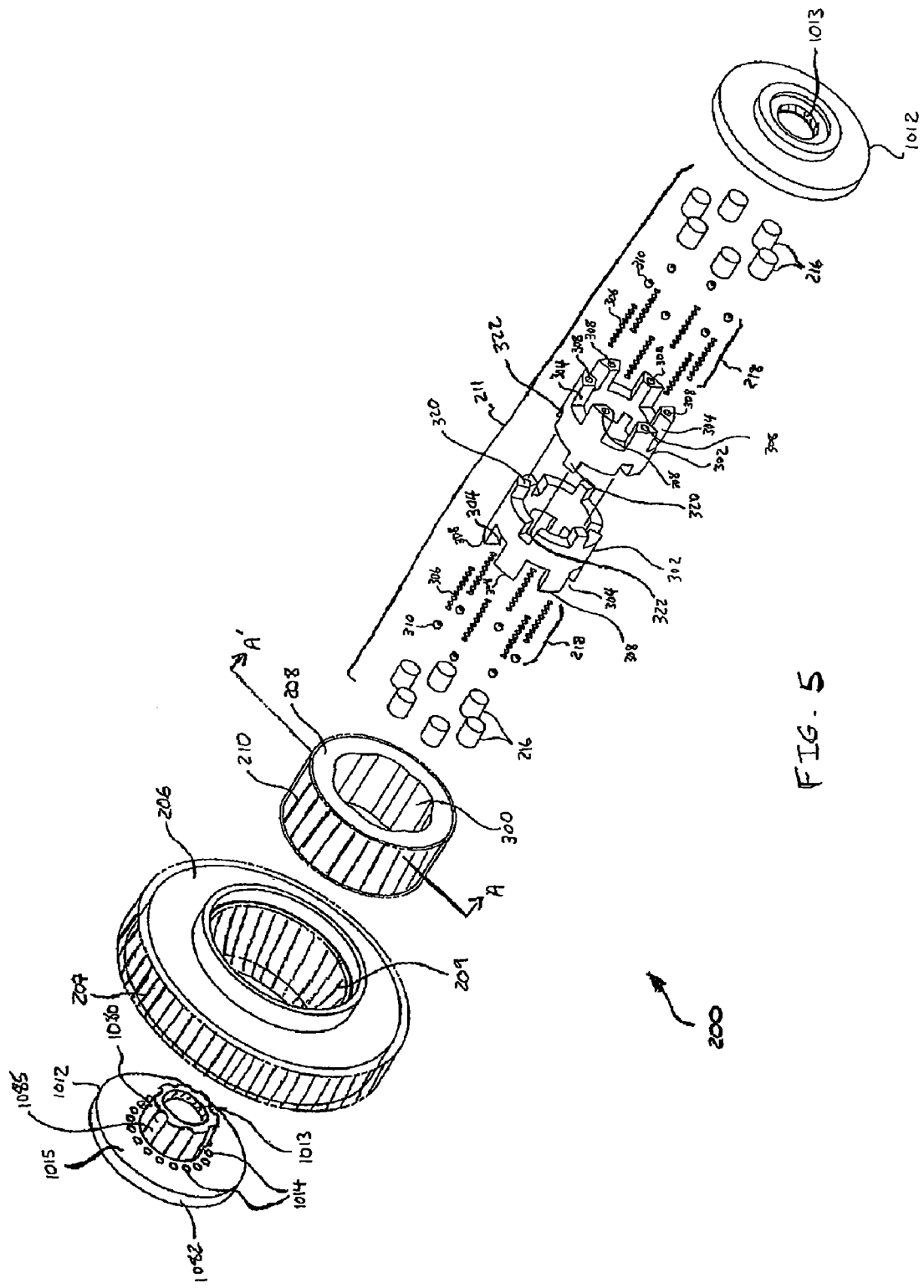
FIG. 5 is an exploded view of the bi-directional overrunning clutch of FIG. 1, in accordance with an alternative embodiment.
Figure 6A:
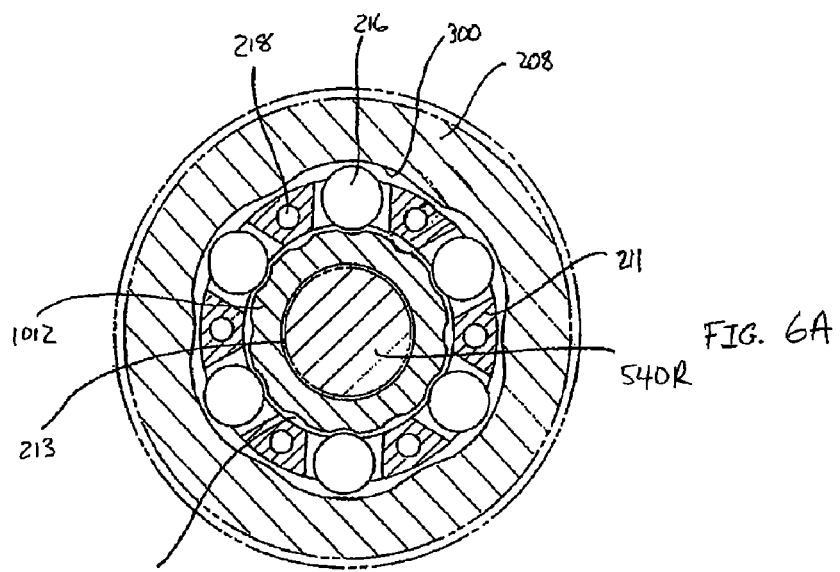
Figure 6B:
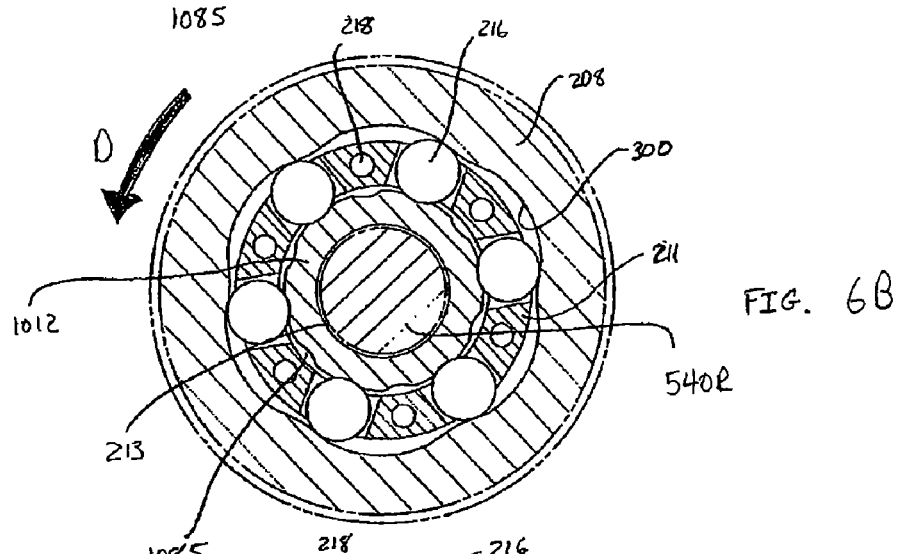
Figure 6C:
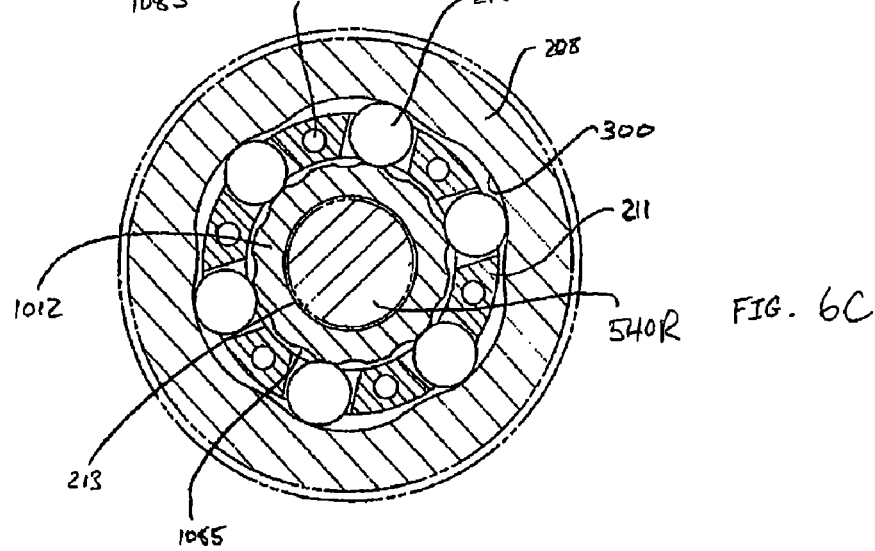

FIGS. 6A, 6B, and 6C are cross-sectional views taken along line A-A' of the bi-directional overrunning clutch of FIG. 5.

FIG. 7 is a plan view of the roller assembly described in FIG. 5.

FIG. 8 is a cross-sectional view taken along line B-B' of the roller assembly of FIG. 7.

Figure 9:
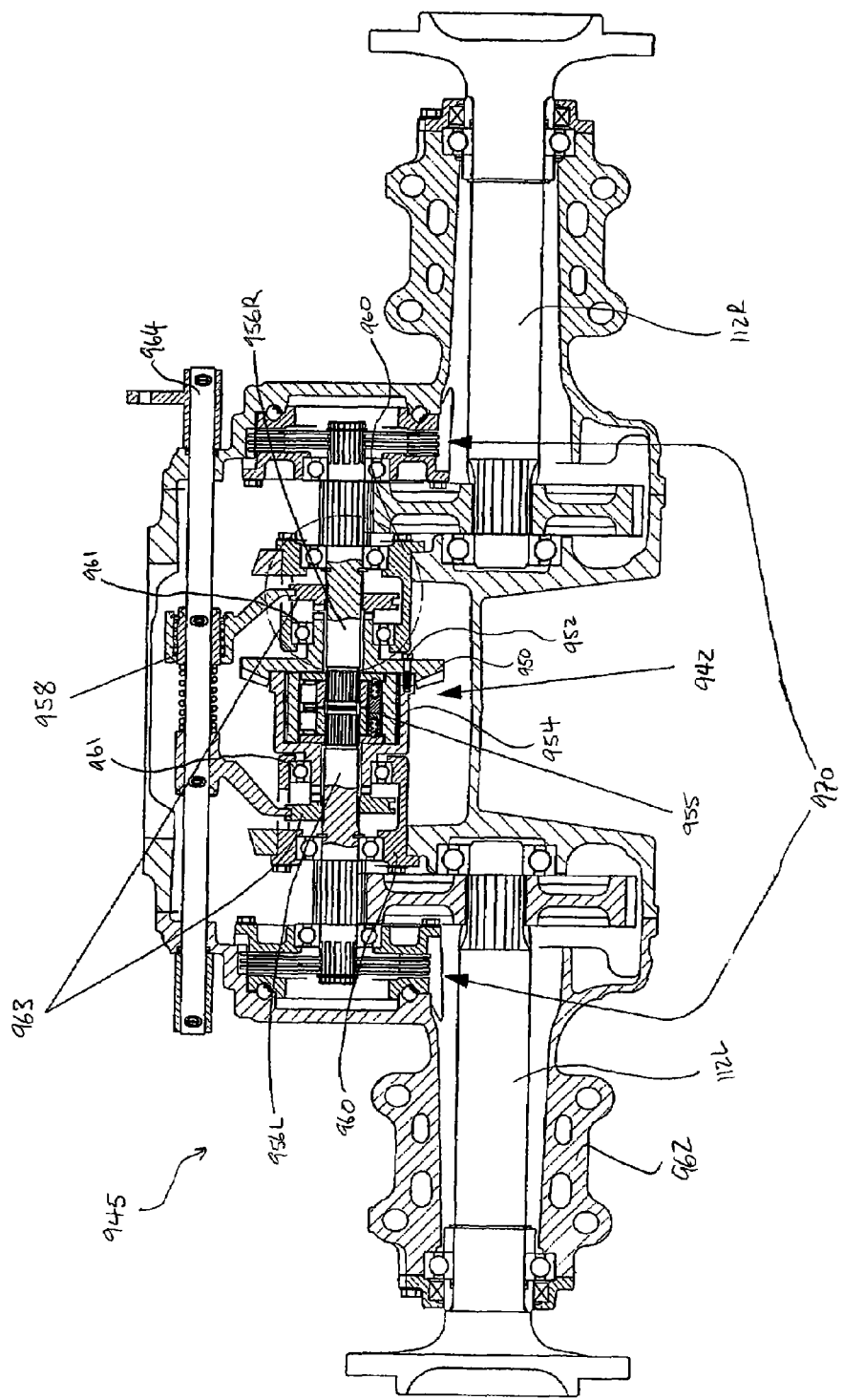

FIG. 9 is a sectional view of a bi-directional overrunning clutch incorporated into a rear transaxle.

Figure 10:
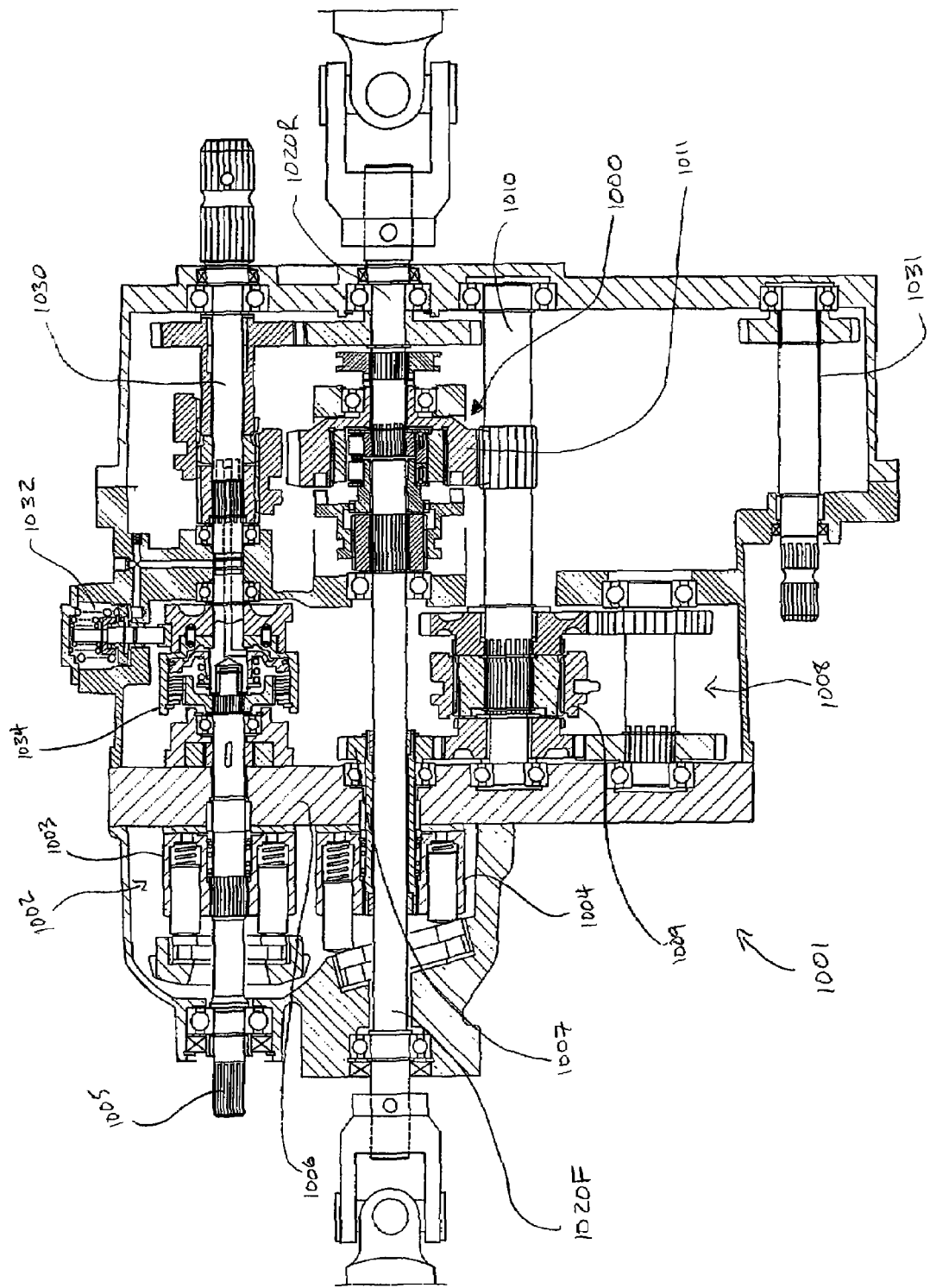

FIG. 10 is a sectional view of a modified bi-directional overrunning clutch incorporated into a central transaxle.

Figure 11:
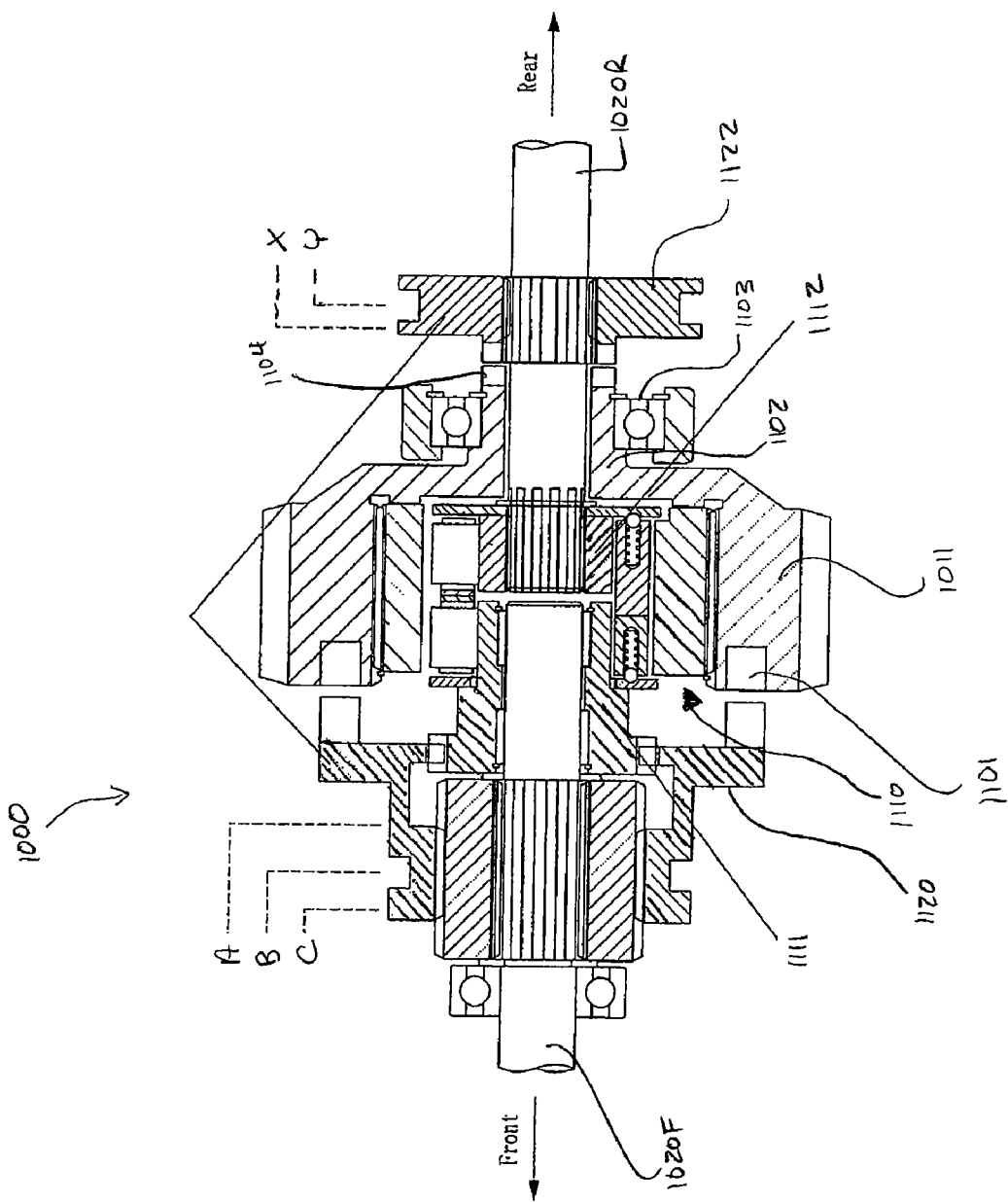

FIG. 11 is a sectional view of the modified bi-directional overrunning clutch of FIG. 10.

FIGS. 12-35 are schematic views of various four-wheel drive system configurations.

DETAILED DESCRIPTION OF THE INVENTION

Embodiments of a bi-directional overrunning clutch are now described with reference to the figures, where like reference numbers indicate identical or functionally similar elements. While specific configurations and arrangements are discussed, it should be understood that this is done for illustrative purposes only. A person skilled in the relevant art will recognize that other configurations and arrangements can be used without departing from the spirit and scope of the appended claims. It will be apparent to a person skilled in the relevant art that the bi-directional overrunning clutch may also be employed in a variety of other applications.

FIGS. 1, 3, 4, and 5 show alternative embodiments of a bi-directional overrunning clutch (200, 500, 900). These embodiments are described in greater detail in co-pending and co-owned U.S. patent application Ser. Nos. 11/090,097 and 11/277,433, which have been incorporated herein by reference. The bi-directional overrunning clutches (200, 500, 900) are used, for example, for transmitting torque between axle shaft segments. Presented in FIGS. 10 and 11 is a modified bi-directional overrunning clutch incorporated into a central transaxle. It would be within the purview of one of skill in the art to use the teachings presented herein to appropriately modify any of the alternative bi-directional overrunning clutches (200, 500, 900), or their equivalents, for use in the central transaxle configuration shown in FIGS. 10 and 11.

Figure 1:
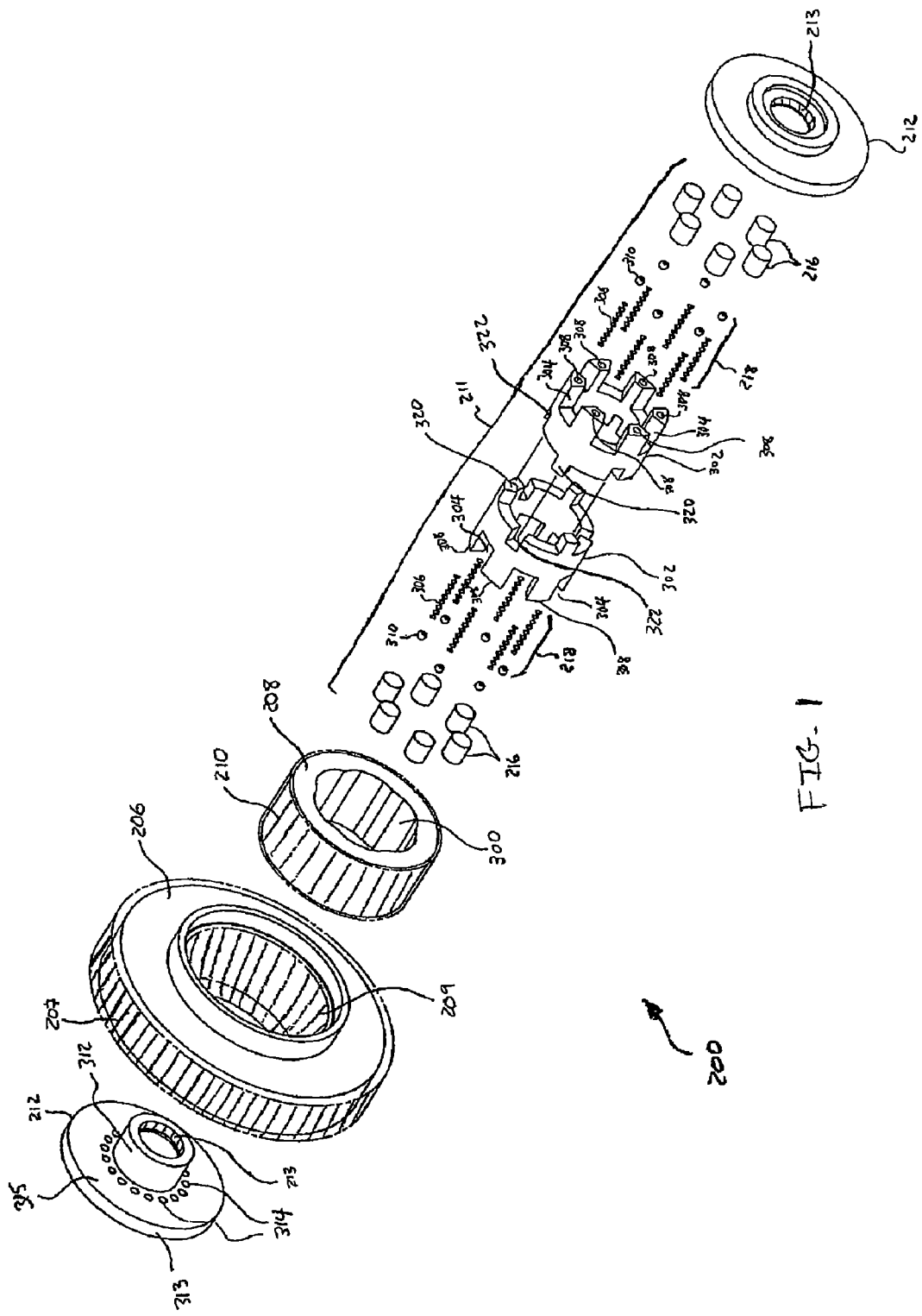
FIG. 1 is an exploded view of a bi-directional overrunning clutch.

FIG. 1 shows an exploded view of a bi-directional overrunning clutch 200. As shown, input gear 206 has gear teeth 207 around its outer periphery. Input gear 206 further includes gear teeth 209 along its inner portion. Gear teeth 209 are fitted to mate with gear teeth 210 on the outer surface of cam gear 208. Thus, rotation of input gear 206 transmits rotational motion to cam gear 208. In an alternative embodiment, input gear 206 and cam gear 208 may be formed of one integral piece. In other alternative embodiments, input gear 206 and/or cam gear 208 may be segmented into multiple pieces as may be deemed necessary by one of skill in the art.

Cam gear 208 includes an inner cam surface 300. Inner cam surface 300 is adapted to form a wedging engagement with roller assembly 211, when roller assembly 211 is disposed within cam gear 208. As such, rotation of input gear 206 rotates cam gear 208 and in turn locks roller assembly 211 into a wedging engagement with inner cam surface 300, and thus transmits rotary motion from input gear 206 to roller assembly 211.

Roller assembly 211 is comprised of a roll cage, which is preferably divided into two roll cage segments 302, having a plurality of recesses 304. One of a plurality of rollers 216 is aligned and held within each recess 304. In operation, the interaction between rollers 216 and inner cam surface 300 produces the wedging engagement described above. Each roll cage segment 302 also includes a plurality of extensions 320 designed to fit within corresponding recesses 322 in the other roll cage segment 302. Preferably, extensions 320 loosely fit within recesses 322 to form a loose fitting interlock between the two roll cage segments 302; with, for example, three degrees of play between the two roll cage segments 302. In an alternative embodiment, the pair of roll cage segments 302 may be replaced with one integral roll cage.

Roller assembly 211 also includes a plurality of spring pins 218, which are comprised of a spring 306 and a ball lock member 310. As shown, a spring pin 218 is disposed within one, or more, of the openings 308 in the roll cage segments 302. In an alternative embodiment, spring pins 218 can be adhered to the surface of each roll cage segment 302 and thereby adapted to extend in a direction coaxial with roller assembly 211. Alternatively, spring pins 218 can be adapted to transect through the entirety of roller assembly 211. Ball lock members 310 are adapted to engage with detents 314 along an inner surface 315 of each hub 212.

When properly assembled, hubs 212 are aligned coaxially with input gear 206 and are located within at least a portion of roller assembly 211. Each hub 212 is generally one integral unit having a base portion 312 and a cover portion 313. In an alternative embodiment, each hub 212 may be comprised of two individual pieces, for example a base and a cover, which are attached by conventional attachment means. When bi-directional overrunning clutch 200 is assembled, base portion 312 is in direct contact with rollers 216, and cover portion 313 covers at least the cam surface 300 of cam gear 208.

Each hub 212 includes a splined portion 213, which is adapted to engage with the ends of axle shaft segments (not shown). As such, rotation of each hub 212 transfers rotary motion to the respective shaft segment to ultimately deliver torque to drive wheels.

The inner surfaces 315 of cover portions 313 of hubs 212 include a plurality of detents 314. Each detent 314 is adapted to engage with a ball lock member 310 of a spring pin 218. In operation, the plurality of detents 314 form a plurality of spring pin engagements with ball lock members 310 of spring pins 218. Thus, rotation of roller assembly 211 rotates hubs 212 through the engagement of spring pins 218. As such, ball lock members 310 serve as friction members creating friction between the roller assembly 211 and the hubs 212. Spring pins 218, however, are adapted to disengage the spring pin engagements if one hub 212 rotates faster than roller assembly 211, or rotates faster than the opposite hub 212.

Figure 2B:
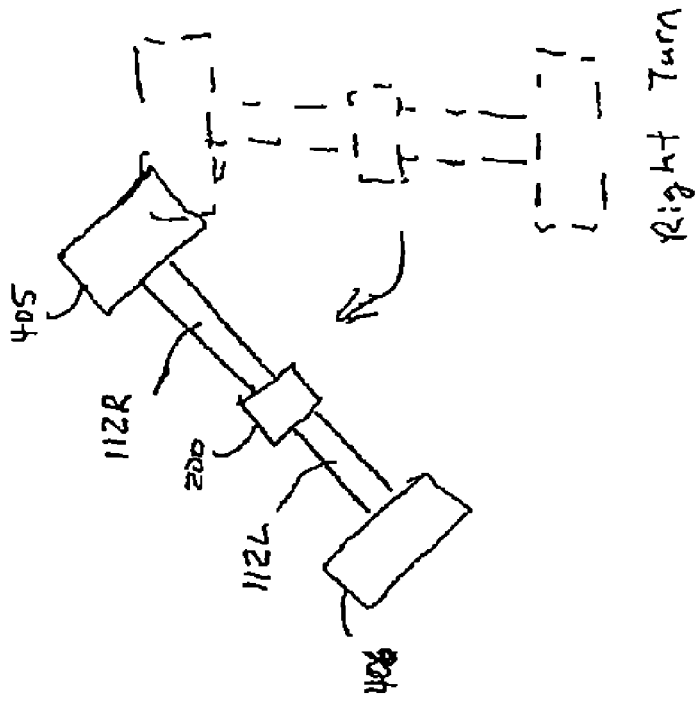
FIG. 2B is a schematic view of a drive axle making a right turn.
Figure 2A:
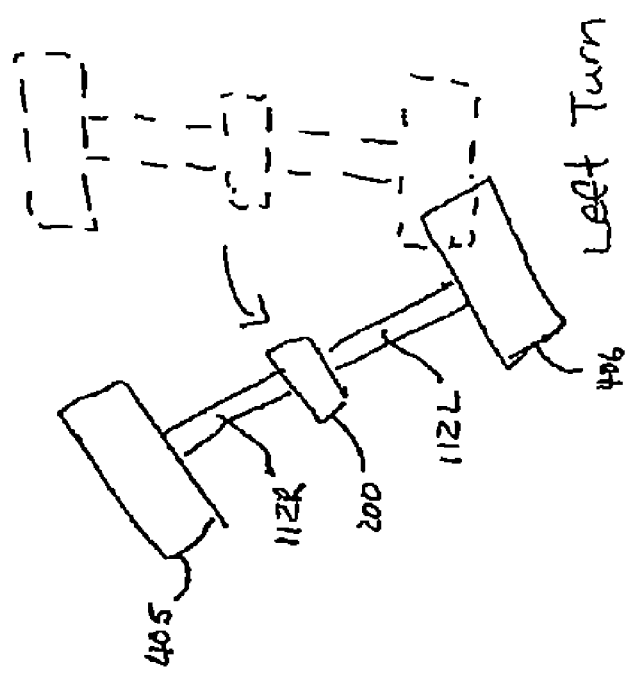
FIG. 2A is a schematic view of a drive axle making a left turn.

For example, when bi-directional overrunning clutch 200 is disposed between left and right axle shaft segments 112L, 112R, and working vehicle 100 is making a left turn, as shown in FIG. 2A, right wheel 405 is forced to turn faster than left wheel 406 because right wheel 405 must cover a greater distance than left wheel 406 in the same amount of time. As such, the quicker rotation of right wheel 405 will result in quicker rotation of right hub 212, than of left hub 212. Spring pins 218, engaged with right hub 212, will disengage with right hub 212, to thereby allow right hub 212 to rotate freely relative to left hub 212. Torque, however, is still transmitted through bi-directional overrunning clutch 200 to left wheel 406 through the spring pin engagements with left hub 212.

When working vehicle 100 is making a right turn, as shown in FIG. 2B, left wheel 406 is forced to turn faster than right wheel 405 because left wheel 406 must cover a greater distance than right wheel 405 in the same amount of time. As such, the quicker rotation of left wheel 406 will result in quicker rotation of left hub 212, than of right hub 212. The spring pins 218, engaged with left hub 212, will disengage with left hub 212, to thereby allow left hub 212 to rotate freely relative to right hub 212. Torque, however, is still transmitted through bi-directional overrunning clutch 200 to right wheel 405 through the spring pin engagements with right hub 212.

Figure 3:
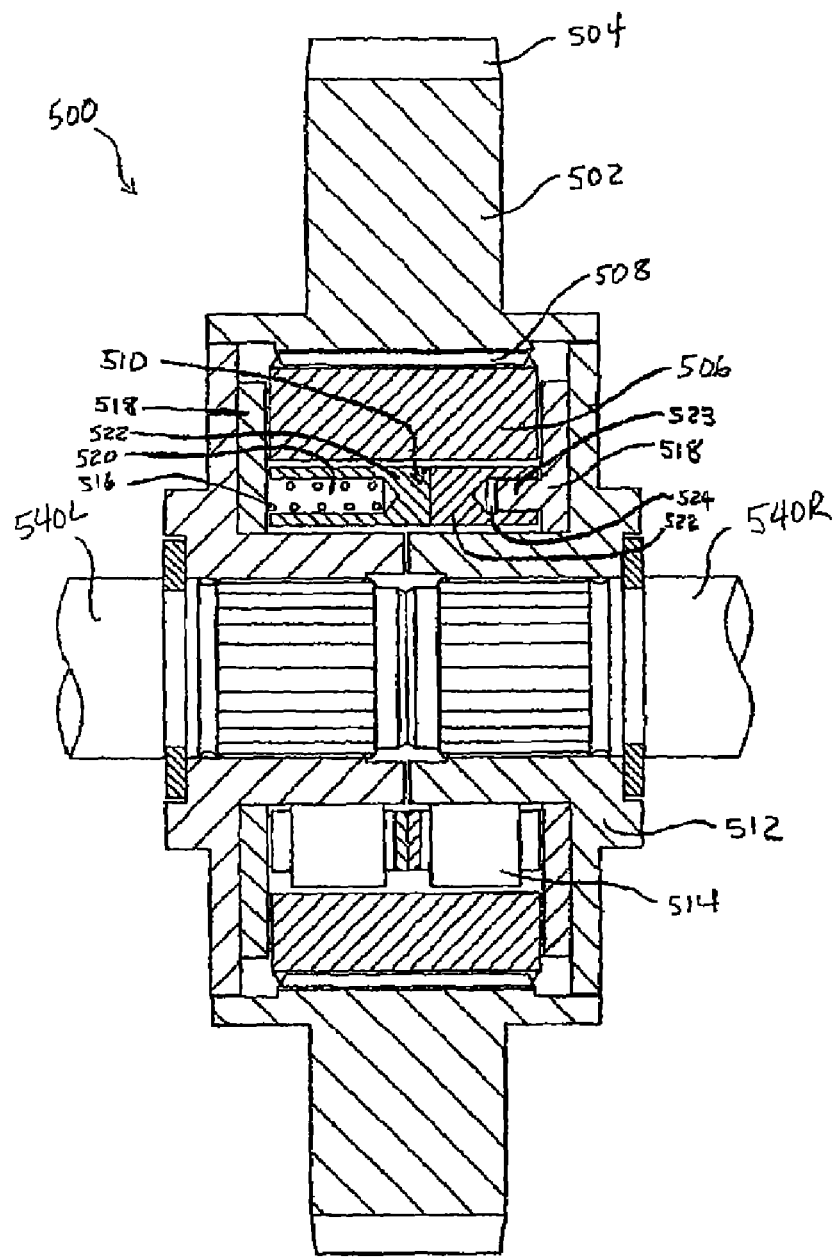
FIG. 3 is a sectional view of a bi-directional overrunning clutch in accordance with an alternative embodiment.

FIG. 3 is a sectional view of a bi-directional overrunning clutch 500 in accordance with an alternative embodiment of the invention. Similar to bi-directional overrunning clutch 200, clutch 500 includes an input gear 502, having gear teeth 504 along its periphery, a cam gear 506, disposed within input gear 502 and mated through gear teeth engagement 508, and a roller assembly 510. In an alternative embodiment, input gear 502 and cam gear 506 may be formed of one integral piece. In other alternative embodiments, input gear 502 and/or cam gear 506 may be segmented into multiple pieces as may be deemed necessary by one of skill in the art. Additionally, hubs 512 are disposed within roller assembly 510 and mated with first and second shaft segments 540L, 540R. Depending on where bi-directional overrunning clutch 500 is intended to be used, first and second shaft segments 540L, 540R may be drive axle shafts, or may be forward and rearward shaft segments (as will be described with relation to FIG. 10).

Rollers 514 are included to form a wedging engagement between roller assembly 510 and cam gear 506. Roller assembly 510 differs from roller assembly 211 in that roller assembly 510 includes springs 516 and friction members 518. Springs 516 are located within recesses 520 in roll cage segments 522. Friction members 518 include protrusions 523, which extend into recesses 524 in roll cage segments 522. Each roll cage segments 522 includes a plurality of alternating recesses 520 and 524, along the circumference of roll cage segments 522, for receiving springs 516 and friction member protrusions 523, respectively.

In operation, springs 516 push against friction members 518, which in turn pushes against hub 512. The spring force of spring 516 also exerts a force in the opposite direction, thus pushing roll cage 522 against the opposite friction member 518 and hub 512. As such, rotation of the roller assembly 510 will transmit rotary motion to hubs 512 through the frictional forces between the friction members 518 on either side of roll cage segments 522. However, when one shaft segment must rotate faster than the roller assembly 510, or faster than the opposite shaft segment, as described above, the frictional force between the hubs 512 and the friction members 518 will be overcome, and one hub 512 will be allowed to freely rotate faster than the roller assembly 510.

Figure 4:
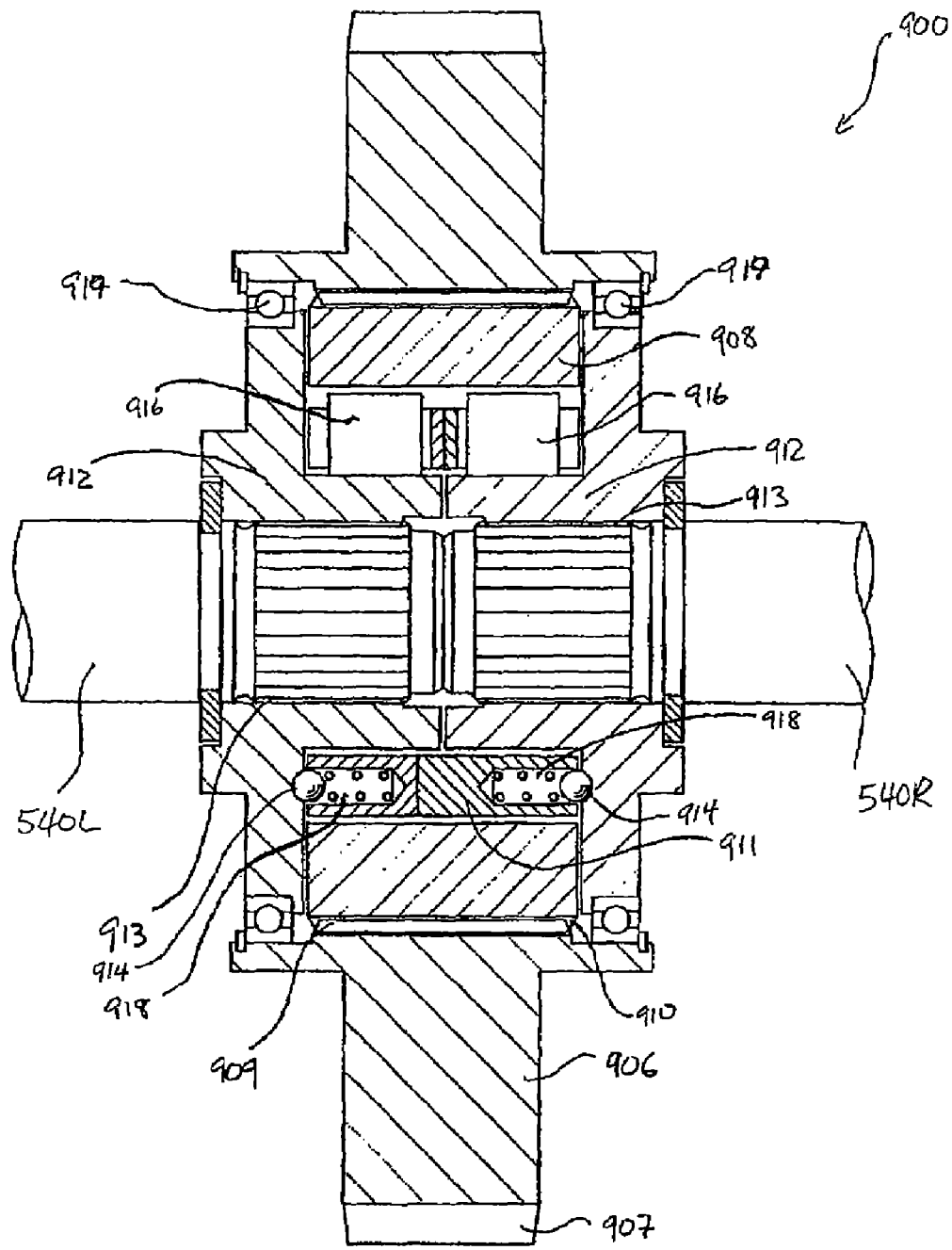
FIG. 4 is a sectional view of a bi-directional overrunning clutch in accordance with an alternative embodiment.

FIG. 4 is a sectional view of a bi-directional overrunning clutch 900, in accordance with an alternative embodiment of the present invention. Bi-directional overrunning clutch 900 is disposed between first and second shaft segments 540L, 540R. Bi-directional overrunning clutch 900 includes an input gear 906. Input gear 906, has gear teeth 907 along its outer periphery.

Gear teeth 907 are adapted to mate with an input pinion gear, such that rotation of input pinion gear transmits rotary motion to input gear 906. Input gear 906 can be formed of a single piece of cast metal, or any other suitable materials known in the art. Input gear 906 may alternatively be formed of a combination of two or more pieces of material.

Disposed within input gear 906, is a cam gear 908. Disposed along the inner portion of input gear 906 are gear teeth 909. Gear teeth 909 mate with gear teeth 910, disposed along the outer surface of cam gear 908 such that rotation of input gear 906 transmits rotary motion to cam gear 908. In an alternative embodiment, input gear 906 and cam gear 908 may be formed of one integral piece. In other alternative embodiments, input gear 906 and/or cam gear 908 may be segmented into multiple pieces as may be deemed necessary by one of skill in the art.

Disposed within cam gear 908 is a roller assembly 911. Roller assembly 911 includes rollers 916 and spring pins 918. Disposed within roller assembly 911 are a pair of hubs 912. Spring pins 918 form spring pin engagements with detents 914 on the inner surface of hubs 912. Further, hubs 912 are engaged with shaft segments 540L, 540R, respectively, through splined engagements 913. Thus, rotation of hubs 912 transmits rotary motion to shaft segments 540L, 540R.

Bi-directional overrunning clutch 900 includes ball bearings 919 disposed between hubs 912 and input gear 906. Ball bearings 919 serve to properly align and hold the uniform distribution of the components of bi-directional overrunning clutch 900. Ball bearings 919 also serve to maintain roller assembly 911 centered within input gear 906. While ball bearings are specifically shown in FIG. 4, one of skill in the art would know that alternative bearings, such as bush bearings, may be used.

FIG. 5 is an exploded view of bi-directional overrunning clutch 200 of FIG. 1, in accordance with an alternative embodiment. The depiction of bi-directional overrunning clutch 200 is similar to that of FIG. 1, with the exception of alternative hubs 1012. It should be noted that while alternative hubs 1012 are shown with respect to clutch 200, such hubs 1012 may be used in all the bi-directional overrunning clutch embodiments (200, 500, and 900) described herein.

As shown, input gear 206 has gear teeth 207 around its outer periphery. Input gear 206 further includes gear teeth 209 along its inner portion. Gear teeth 209 are fitted to mate with gear teeth 210 on the outer surface of cam gear 208. Thus, rotation of input gear 206 transmits rotational motion to cam gear 208. In an alternative embodiment, input gear 206 and cam gear 208 may be formed of one integral piece. In other alternative embodiments, input gear 206 and/or cam gear 208 may be segmented into multiple pieces as may be deemed necessary by one of skill in the art.

Cam gear 208 includes an inner cam surface 300. Inner cam surface 300 is adapted to form a wedging engagement with roller assembly 211, when roller assembly 211 is disposed within cam gear 208. As such, rotation of input gear 206 rotates cam gear 208 and in turn locks roller assembly 211 into a wedging engagement with inner cam surface 300, and thus transmits rotary motion from input gear 206 to roller assembly 211.

Roller assembly 211 is comprised of a pair of roll cage segments 302 having a plurality of recesses 304. One of a plurality of rollers 216 is aligned and held within each recess 304. In operation, the interaction between rollers 216 and inner cam surface 300 produces the wedging engagement described above. Each roll cage segment 302 also includes a plurality of extensions 320 designed to fit within corresponding recesses 322 in the other roll cage segment 302. Preferably, extensions 320 loosely fit within recesses 322 to form a loose fitting interlock between the two roll cage segments 302; with, for example, about three degrees of play between the two roll cage segments 302.

Roller assembly 211 also includes a plurality of spring pins 218, which are comprised of a spring 306 and a ball lock member 310. As shown, a spring pin 218 is disposed within one, or more, of the openings 308 in the roll cage segments 302. In an alternative embodiment, spring pins 218 can be adhered to the surface of roll cage segment 302 and thereby extend in a direction coaxial with roller assembly 211. Alternatively, spring pins 218 can transect through the entirety of roller assembly 211. Ball lock members 310 engage with detents 1014 along an inner surface 1015 of each hub 1012.

When properly assembled, hubs 1012 are aligned coaxially with input gear 206 and are located within at least a portion of roller assembly 211. Each hub 1012 is generally one integral unit having a base portion 1080 and a cover portion 1082. In an alternative embodiment, each hub 1012 may be comprised of two individual pieces, for example a base and a cover, which are attached by conventional attachment means.

When bi-directional overrunning clutch 200 is assembled, base portion 1080 is in direct contact with rollers 216, and cover portion 1082 covers at least the cam surface 300 of cam gear 208. The outer surface of base portion 1080 includes detents 1085. Detents 1085 serve to engage rollers 216 when clutch 200 is in rotation. As such, detents 1085 are positive locking elements which help transmit torque from roller assembly 211 to hub 1012.

The inner surfaces 1015 of cover portions 1082 of hubs 1012 include a plurality of detents 1014. Each detent 1014 engages with a ball lock member 310 of a spring pin 218. In operation, the plurality of detents 1014 form a plurality of spring pin engagements with ball lock members 310 of spring pins 218. Such spring pin engagements serve to properly align and hold the roller assembly such that rollers 216 engage with detents 1085. Spring pins 218, however, disengage the spring pin engagements if one hub 212 rotates faster than roller assembly 211, or rotates faster than the opposite hub 212.

Each hub 1012 also includes a splined portion 213, which engages with the ends of shaft segments (not shown). As such, rotation of each hub 1012 transfers rotary motion to the respective shaft segment.

FIGS. 6A, 6B, and 6C are cross-sectional views taken along line A-A' of the assembled bi-directional overrunning clutch of FIG. 5. FIGS. 6A, 6B, and 6C show cam gear 208, roller assembly 211, hub 1012, and shaft segment 540R. Roller assembly 211 includes rollers 216 and spring pins 218. Hub 1012 is engaged with shaft segment 540R through splined engagement 213.

Thus, rotation of hub 1012 transmits rotary motion to shaft segment 540R.

The left side of bi-directional overrunning clutch 200 is a mirror image of the right side.

Hub 1012 includes detents 1085, which serve to engage with rollers 216 under operative conditions. For example, FIG. 6A shows bi-directional overrunning clutch 200 in a neutral disengaged position. As such, rollers 216 are engaged with detents 1085, but not engaged with cam surface 300 of cam gear 208. When input gear is rotated in direction D, torque is transmitted to cam gear 208 through the splined engagement formed between teeth 209 and 210. FIG. 6B shows an engaged position. In FIG. 6B, cam gear 208 is turned in direction D, which in turn forces engagement between rollers 216 and cam surface 300. When rollers 216 are engaged with cam surface 300, torque is transmitted from the cam gear 208 to hub 1012 through the engagements between rollers 216 and detents 1085. As such, torque is transmitted to shaft segment 540R.

In the case in which one shaft segment 540R and respective hub 1012 overrun the roller assembly 211, rollers 216 disengage from detents 1085. This disengagement allows the shaft segment to rotate faster than the clutch 200. Such overrunning condition is shown in FIG. 6C. When the two shaft segments return to normal conditions, the clutch 200 returns to the engaged position shown in FIG. 11B.

For optimal operation, there should be a loose fitting engagement between the two roll cage segments 302 of the roller assembly. Such a degree of play is illustrated in FIG. 7, which is a plan view of a roller assembly 1211. Roller assembly 1211 is similar to roller assembly 211. Each roll cage segment 302R, 302L includes a plurality of recesses 304. One of a plurality of rollers 216 is aligned and held within each recess 304. Each roll cage segment 302R, 302L also includes a plurality of extensions 320R, 320L designed to fit within corresponding recesses 322 in the opposite facing roll cage. Preferably, extensions 320R, 320L loosely fit within recesses 322 to form a loose fitting interlock between the two roll cage segments 302R, 302L; with, for example, about three degrees of play between the two roll cages. In an alternative embodiment, the pair of roll cage segments may have up to thirty six degrees of play.

FIG. 8 is a cross-sectional view taken along line B-B' of the roller assembly 1211 of FIG. 7. FIG. 8 shows how alternating extensions 320R, 320L of roll cage segments 302R, 302L form a loosely fitting engagement. The space 1322 between the extensions 320R, 320L allow for the degree of play between the roll cage segments 302R, 302L.

FIG. 9 is a sectional view of a bi-directional overrunning clutch 942 incorporated into a rear transaxle 945. Bi-directional overrunning clutch 942 is similar to the above-described bi-directional overrunning clutches 200, 500, and 900, but has a modified input gear 950. Input gear 950 is a bull gear attached to an input housing 954 by a bolt 952. As such, rotation of input gear 950 rotates input housing 954. A roller assembly 955 is disposed within input housing 954. Roller assembly 955 may be designed as any of the above-described roller assemblies 211, 510, 911, and 1211. Roller assembly 955 is engaged with first and second shaft segments 956L, 956R to thereby provided differential rotation of the first and second shaft segments. First and second shaft segments 956L, 956R are then drivingly coupled to left and right drive axle shafts 112L, 112R.

Bi-directional overrunning clutch 942 is mounted onto support structure 960 via ball bearings 961. Support structure 960 is then secured onto rear transaxle housing 962. Disposed about bi-directional overrunning clutch 942 are differential lock sliders 963. Actuation of differential lock sliders 963 forces the locked engagement of input gear 950 and input housing 954 with first and second shaft segments 956L, 956R. Differential lock sliders are actuated by locking mechanism 958. As such, rotation of lock shaft 964 actuates the sliders 963 to thereby lock the differential function of bi-directional overrunning clutch 942.

Rear transaxle 945 also includes a brake mechanism 970. Brake mechanism 970 may be actuated to slow the rotation of first and second shaft segments 956L, 956R. Brake mechanism 970 employs friction brake plates and is actuated by known braking configurations.

FIG. 10 is a sectional view of a modified bi-directional overrunning clutch 1000 incorporated into a central transaxle 1001. Central transaxle 1001 includes a hydrostatic transmission (HST) 1002. HST 1002 includes a hydraulic pump 1003 and hydraulic motor 1004. While an HST is shown, the transmission may be any type of transmission known to the art; for example, an integrated hydrostatic transmission (IHT) or a standard mechanical transmission. An exemplary IHT is described in U.S. Pat. No. 6,619,038, the disclosure of which is hereby incorporated by reference in its entirety. An exemplary mechanical transmission is described in U.S. Pat. No. 6,098,386, the disclosure of which is hereby incorporated by reference in its entirety.

Central transaxle 1001 receives drive power from a prime mover through input shaft 1005. In operation, input shaft 1005 rotates hydraulic pump 1003. Hydraulic pump 1003 is fluidly connected to hydraulic motor 1004 through center section 1006. As such, hydraulic pump 1003 drives hydraulic motor 1004, which in turn rotates output gear 1007. Rotation of output gear 1007 drives rotation of the gears in a speed change unit 1008.

Speed change unit 1008 includes a speed selector slider 1009, which may be adjusted to select between high and low speeds according to which gear it is set to interlock with. Ultimately, speed change unit 1008 drives rotation of intermediary shaft 1010. Rotation of intermediary shaft 1010, drives rotation of input gear 1011 of bi-directional overrunning clutch 1000.

Bi-directional overrunning clutch 1000, as further described with respect to FIG. 11 below, is modified for use in central transaxle 1001, but is modeled from the above-described bi-directional overrunning clutches 200, 500, and 900. Bi-directional overrunning clutch 1000 functions to provide selective differential rotation between forward and rearward shaft segments 1020F, 1020R. Ultimately, rotary motion is delivered from forward and rearward shaft segments 1020F, 1020R to front and rear transaxles (not shown).

Central transaxle 1001 also includes first and second power-take-off (PTO) shafts 1030, 1031, for transmitting drive power to accessory components of the working vehicle. PTO shaft 1030 is driven by known means, such as PTO selector 1032 and PTO drive means 1034. PTO shaft 1031 is also driven by known means. The drive train driving PTO shaft 1031 is not shown, however.

FIG. 11 is a sectional view of the modified bi-directional overrunning clutch 1000 of FIG. 10. Bi-directional overrunning clutch 1000 includes input gear 1011. Input gear 1011 includes receiving bores 1101 for receiving clutch slider 1120. Input gear 1011 also includes an extended region 1102 for mounting input gear 1011 on ball bearings 1103. An end 1104 of the extended region 1102 of input gear 1011 is adapted to engage with clutch slider 1122.

Bi-directional overrunning clutch 1000 also includes a roller assembly 1110. Roller assembly 1110 may be modeled from any of the above-described roller assemblies 211, 510, 911, and 1211. Roller assembly 1110, however, is modified for incorporation into central transaxle 1001. Specifically, roller assembly 1110 includes an extended hub 1111 and a customary hub 1112.

While customary hub 1112 is in splined engagement with rearward shaft segment 1020R, extended hub 1111 is not in splined engagement with forward shaft segment 1020F. Rotary motion of extended hub 1111 is only transmitted to forward shaft segment 1020F through clutch slider 1120, which is in splined engagement with forward shaft segment 1020F. One of skill in the art would readily see that the differential configuration may be reversed such that forward shaft segment 1020F is in splined engagement with a customary hub, while rearward shaft segment 1020R is engaged to an extended hub through a clutch slider.

Clutch slider 1120 is adapted for three settings A, B, and C. As shown, clutch slider 1120 is set in setting B. In setting B, a disengaged setting, clutch slider 1120 allows bi-directional overrunning clutch 1000 to perform its differential function of differentially transmitting torque to the forward shaft segment 1020F. In setting A, an engaged setting, clutch slider 1120 locks forward shaft segment 1020F to input gear 1011 to thereby cancel the differential function. In setting C, a neutral setting, clutch slider 1120 is uncoupled from extended hub 1111, thereby decoupling the forward shaft segment 1020F from the bi-directional overrunning clutch 1000. In setting C, transmission of torque to forward shaft segment 1020F is prevented.

Clutch slider 1122 is adapted for two settings X and Y. As shown, clutch slider 1122 is set in setting Y. In setting Y, a disengaged setting, clutch slider 1122 allows bi-directional overrunning clutch 1000 to perform its differential function of differentially transmitting torque to the rearward shaft segment 1020R. In setting X, an engaged setting, clutch slider 1122 locks rearward shaft segment 1020R to input gear 1011 to thereby cancel the differential function. If the differential configuration is reversed such that forward shaft segment 1020F is in splined engagement with a customary hub, while rearward shaft segment 1020R is engaged to an extended hub through a clutch slider, then the rearward shaft may be decoupled from the bi-directional overrunning clutch be decoupling the extended hub from the clutch slider on the rear side.

FIGS. 12-35 are schematic views of various four-wheel drive system configurations.

Figure 12:
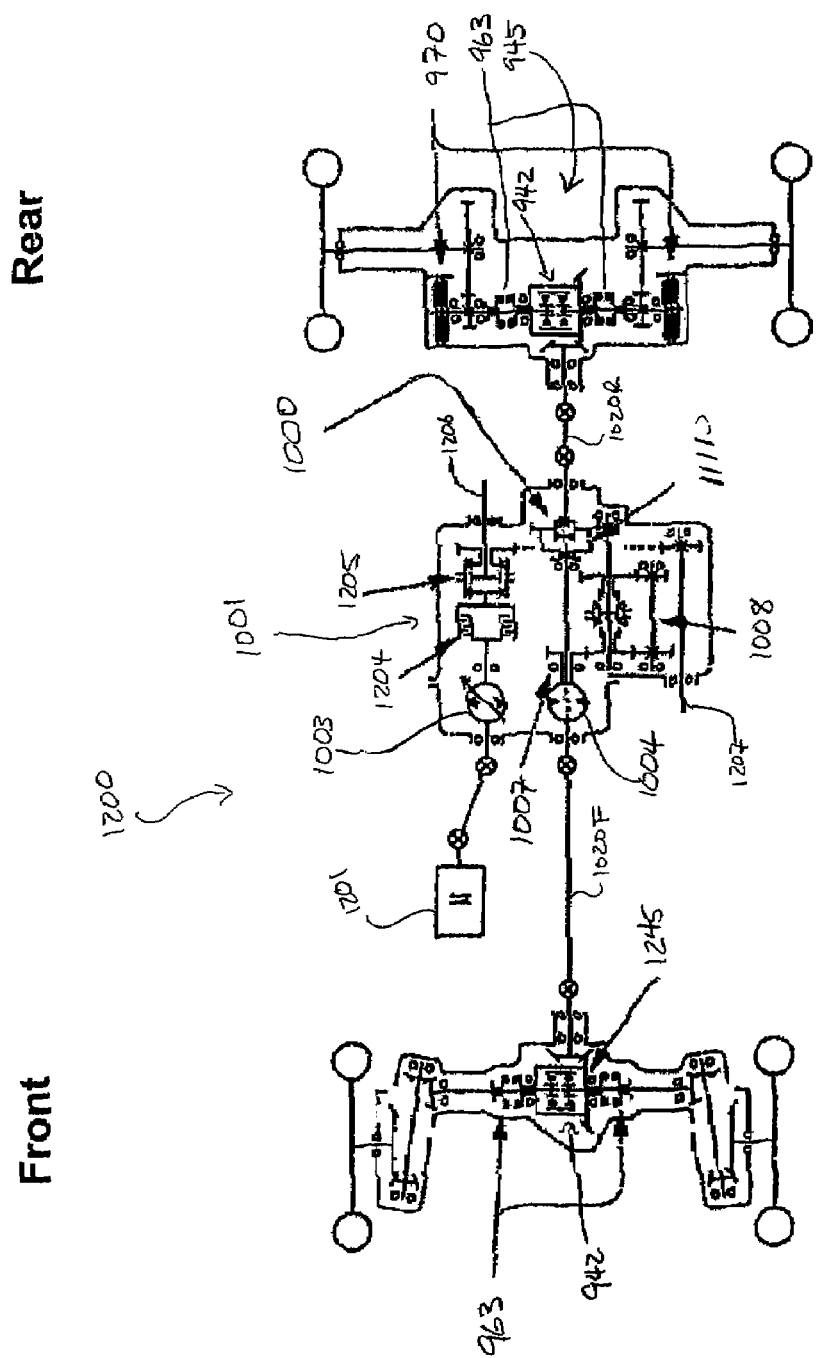

FIG. 12 is a schematic view of a four-wheel drive system configuration 1200. As shown, a prime mover 1201 delivers rotary motion to a central transaxle, such as the central transaxle 1001 described in FIG. 10. In operation, prime mover 1201 drives a hydraulic pump 1003, which in turn drives a hydraulic motor 1004. Configuration 1200 also includes a PTO clutch 1204, PTO selector 1205, and PTO shafts 1206, 1207, which are driven by prime mover 1202. Output gear 1007 of hydraulic motor 1004 then drives bi-directional overrunning clutch 1000 through speed change unit 1008. Bi-directional overrunning clutch 1000 includes a forward clutch slider 1111. Bi-directional overrunning clutch 1000 transmits differential rotation to forward and rearward shaft segments 1020F, 1020R. Rearward shaft segment delivers torque to the rear transaxle 945 described in FIG. 9. Forward shaft segment 1020F delivers torque to a front transaxle 1245. Front transaxle 1245 includes a bi-directional overrunning clutch 945, having differential lock sliders 963, similar to the configuration of rear transaxle 945.

Figure 13:
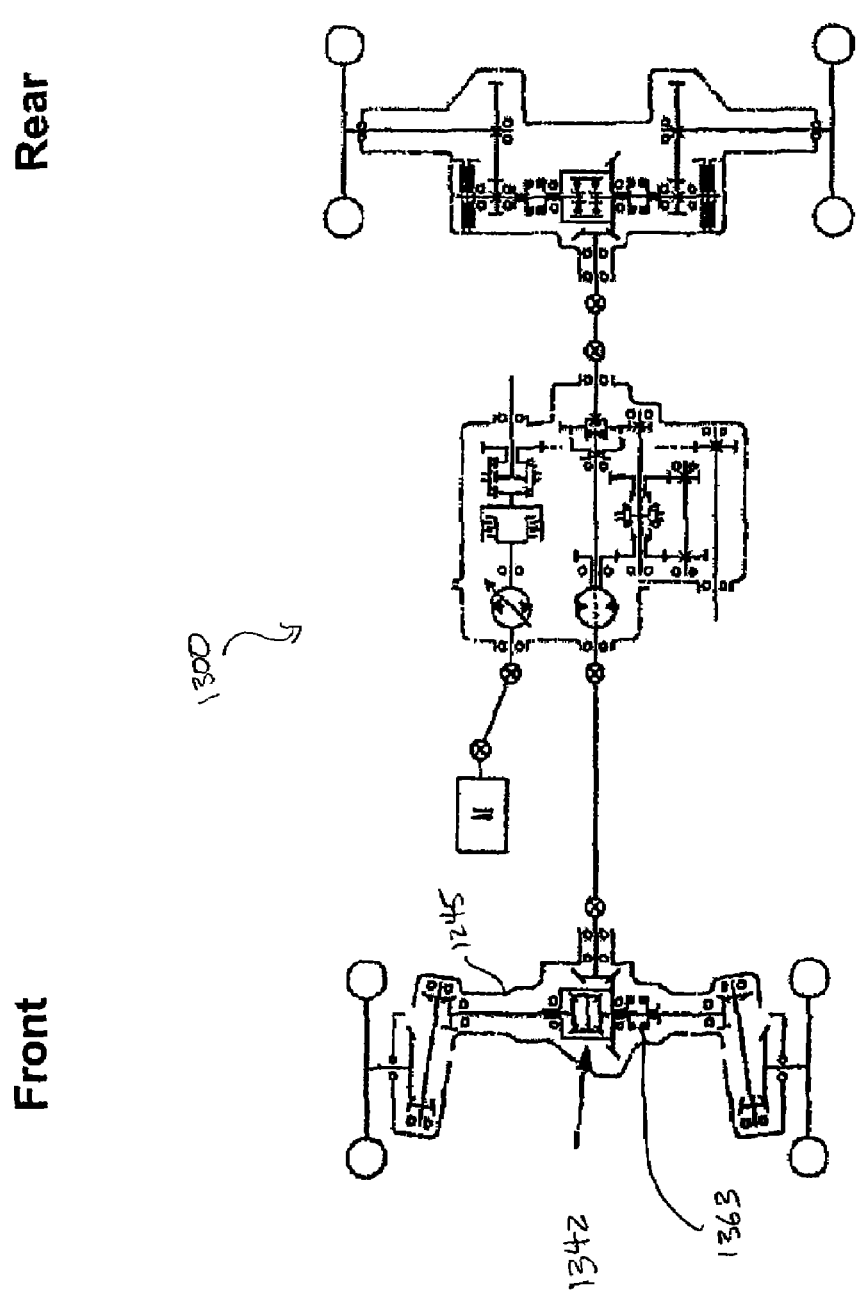

FIG. 13 is a schematic view of a four-wheel drive system configuration 1300. Configuration 1300 is identical to configuration 1200, with the exception that bi-directional overrunning clutch 945 in the front transaxle 1245 is exchanged for a standard differential unit 1342 with a standard differential lock 1363.

Figure 14:
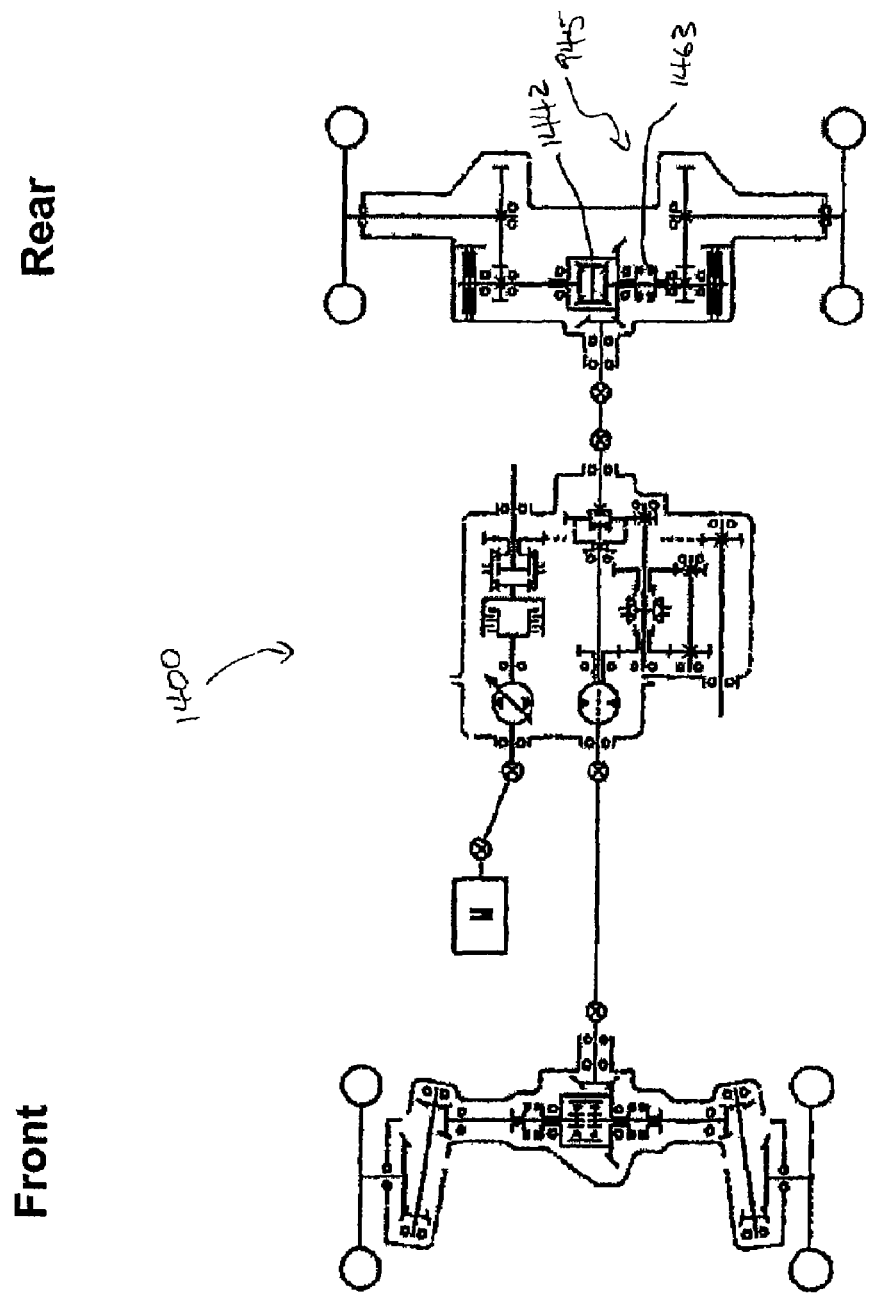

FIG. 14 is a schematic view of a four-wheel drive system configuration 1400. Configuration 1400 is identical to configuration 1200, with the exception that bi-directional overrunning clutch 942 in the rear transaxle 945 is exchanged for a standard differential unit 1442 with a standard differential lock 1463.

Figure 15:
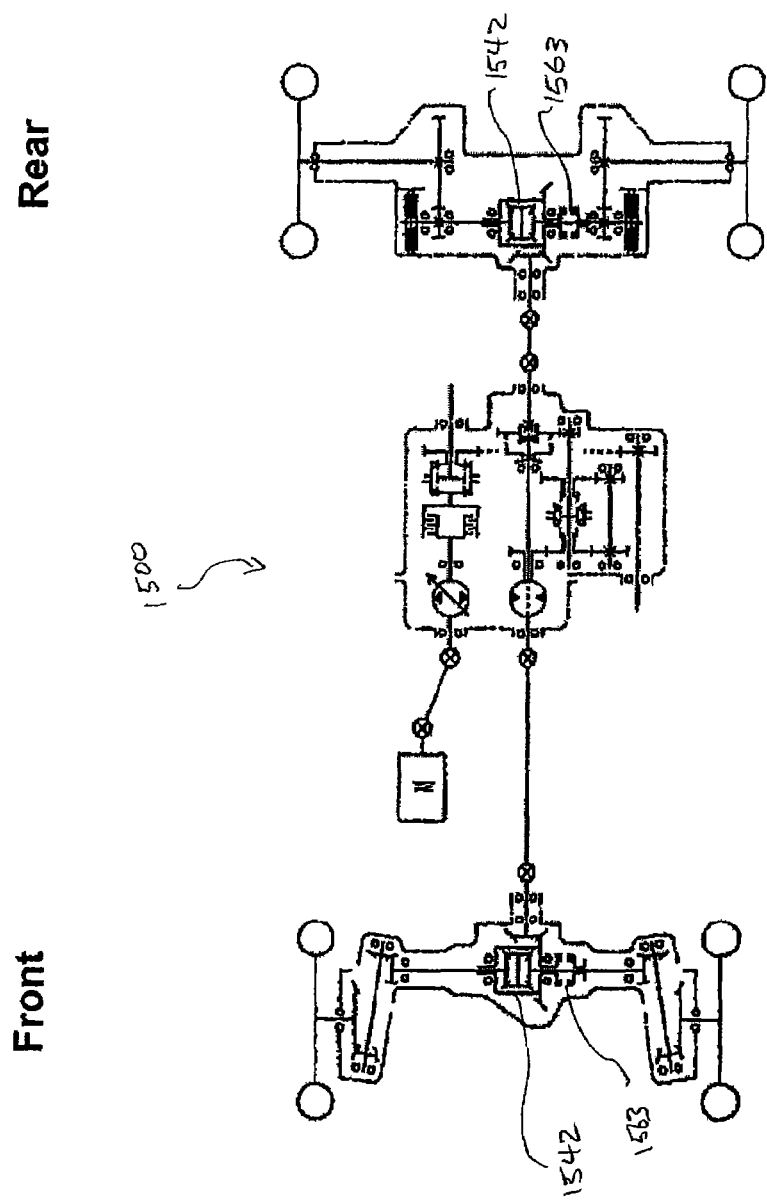

FIG. 15 is a schematic view of a four-wheel drive system configuration 1500. Configuration 1500 is identical to configuration 1200, with the exception that both bi-directional overrunning clutches 942 in the front and rear transaxles 1245 and 945 are exchanged for a standard differential units 1542 with a standard differential locks 1563.

Figure 16:
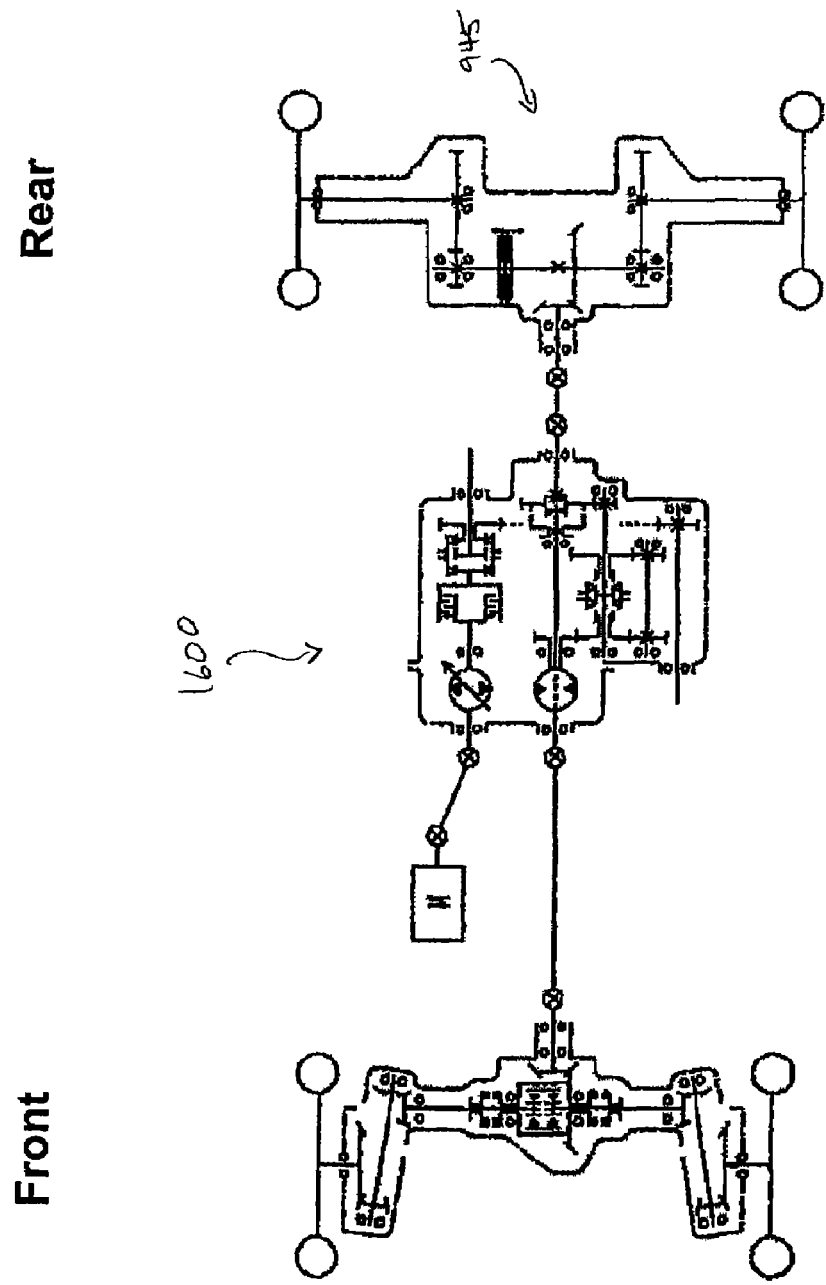

FIG. 16 is a schematic view of a four-wheel drive system configuration 1600. Configuration 1600 is identical to configuration 1200, with the exception that the rear transaxle 945 does not include a bi-directional overrunning clutch.

Figure 17:
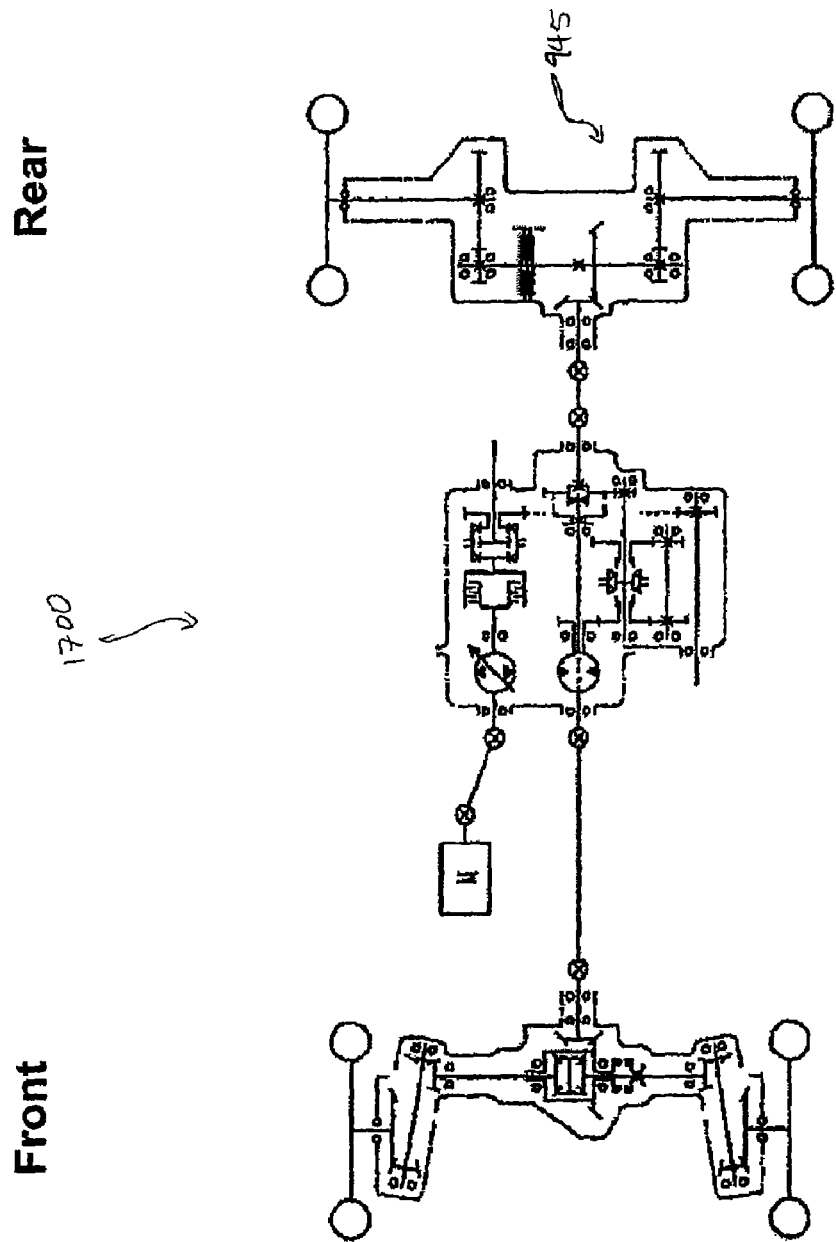

FIG. 17 is a schematic view of a four-wheel drive system configuration 1700. Configuration 1700 is identical to configuration 1300, with the exception that the rear transaxle 945 does not include a bi-directional overrunning clutch.

Figure 18:
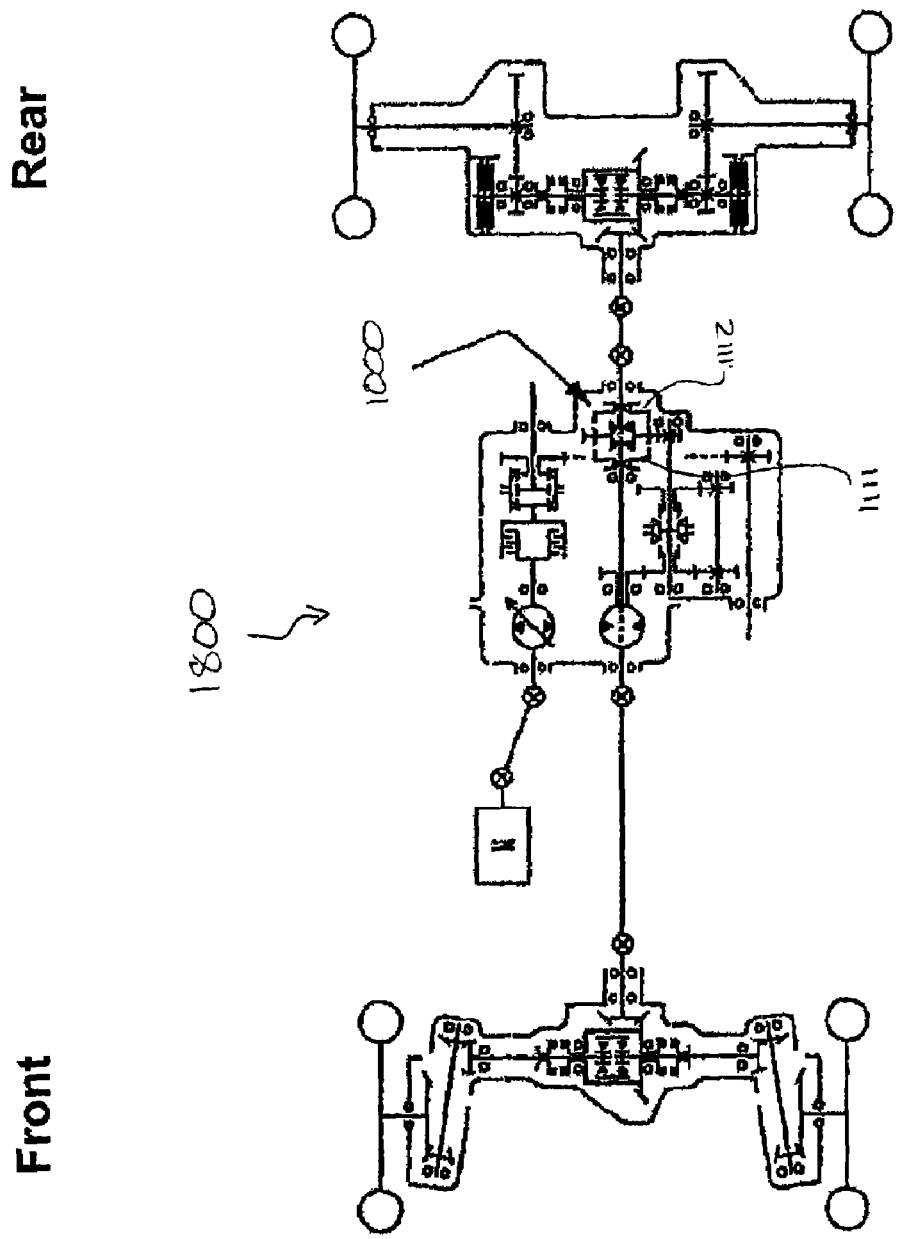

FIG. 18 is a schematic view of a four-wheel drive system configuration 1800. Configuration 1800 is identical to configuration 1200, with the exception that bi-directional overrunning clutch 1000 includes forward and rearward clutch sliders 1111, 1112.

Figure 19:
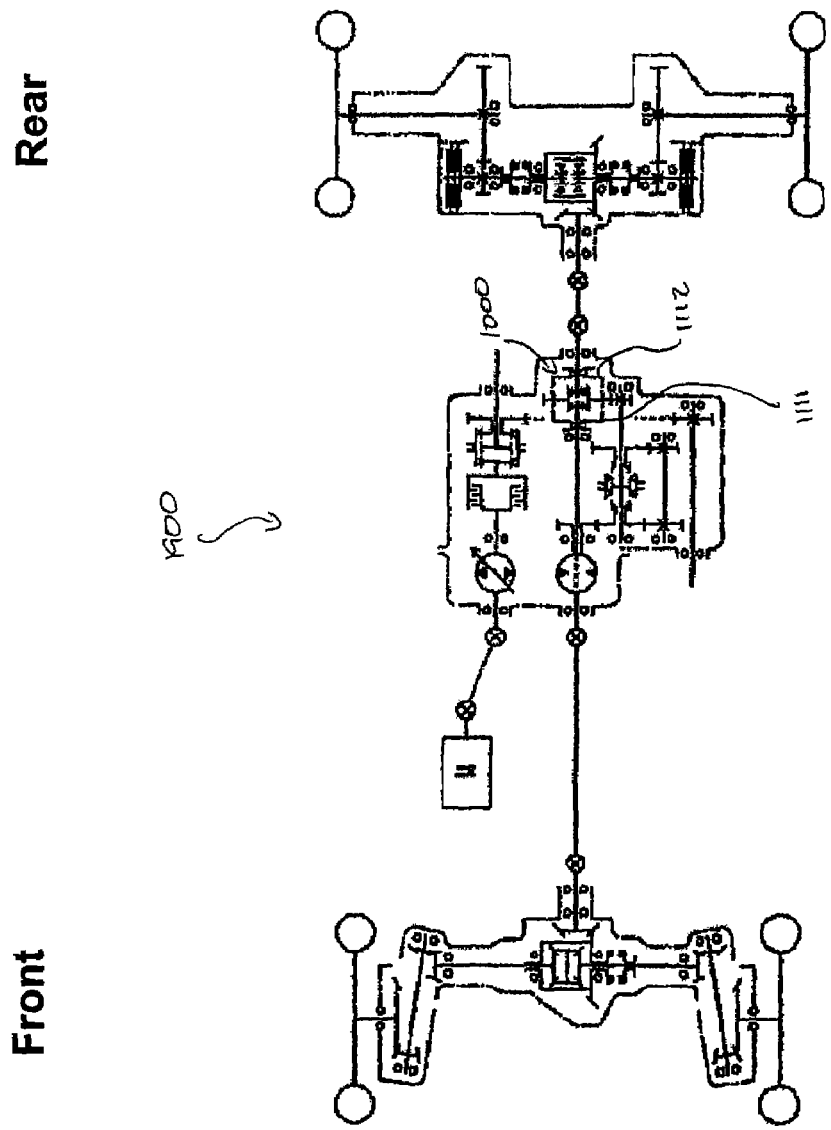

FIG. 19 is a schematic view of a four-wheel drive system configuration 1900. Configuration 1900 is identical to configuration 1300, with the exception that bi-directional overrunning clutch 1000 includes forward and rearward clutch sliders 1111, 1112.

Figure 20:
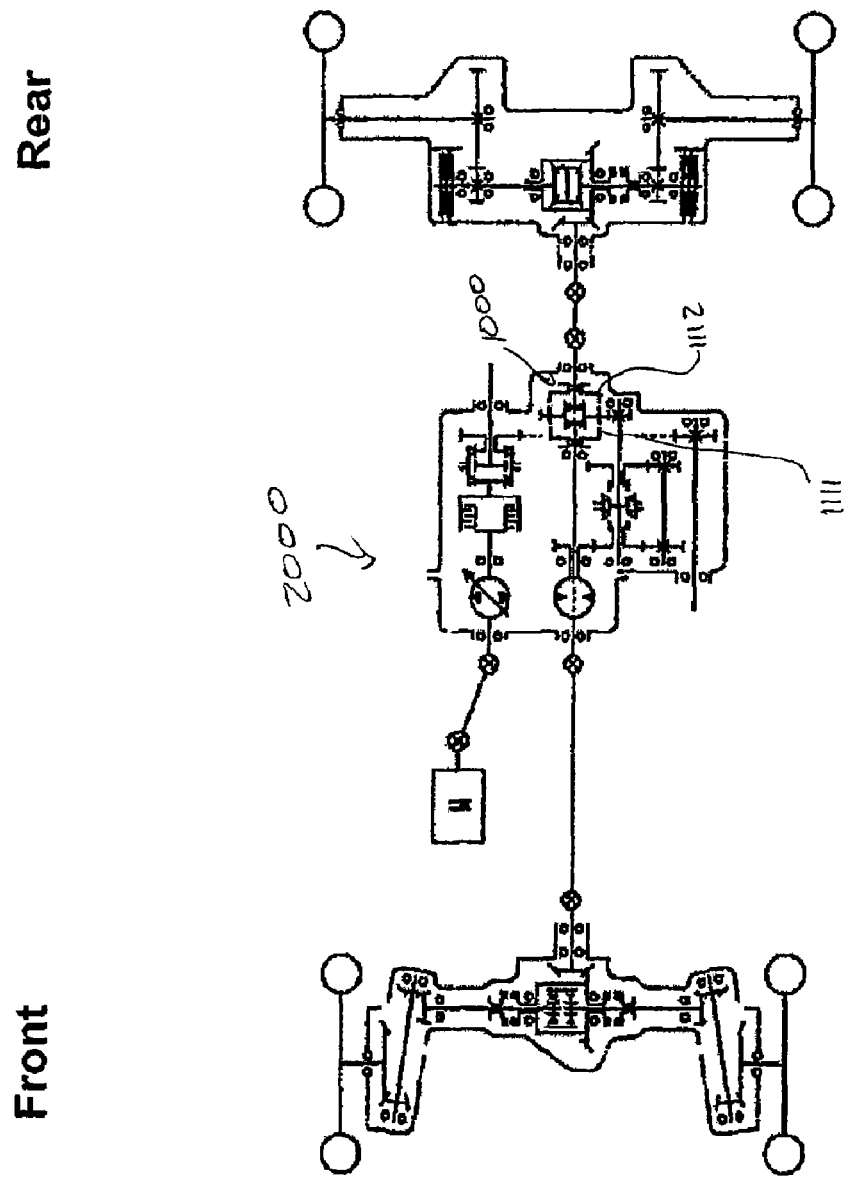

FIG. 20 is a schematic view of a four-wheel drive system configuration 2000. Configuration 2000 is identical to configuration 1400, with the exception that bi-directional overrunning clutch 1000 includes forward and rearward clutch sliders 1111, 1112.

Figure 21:
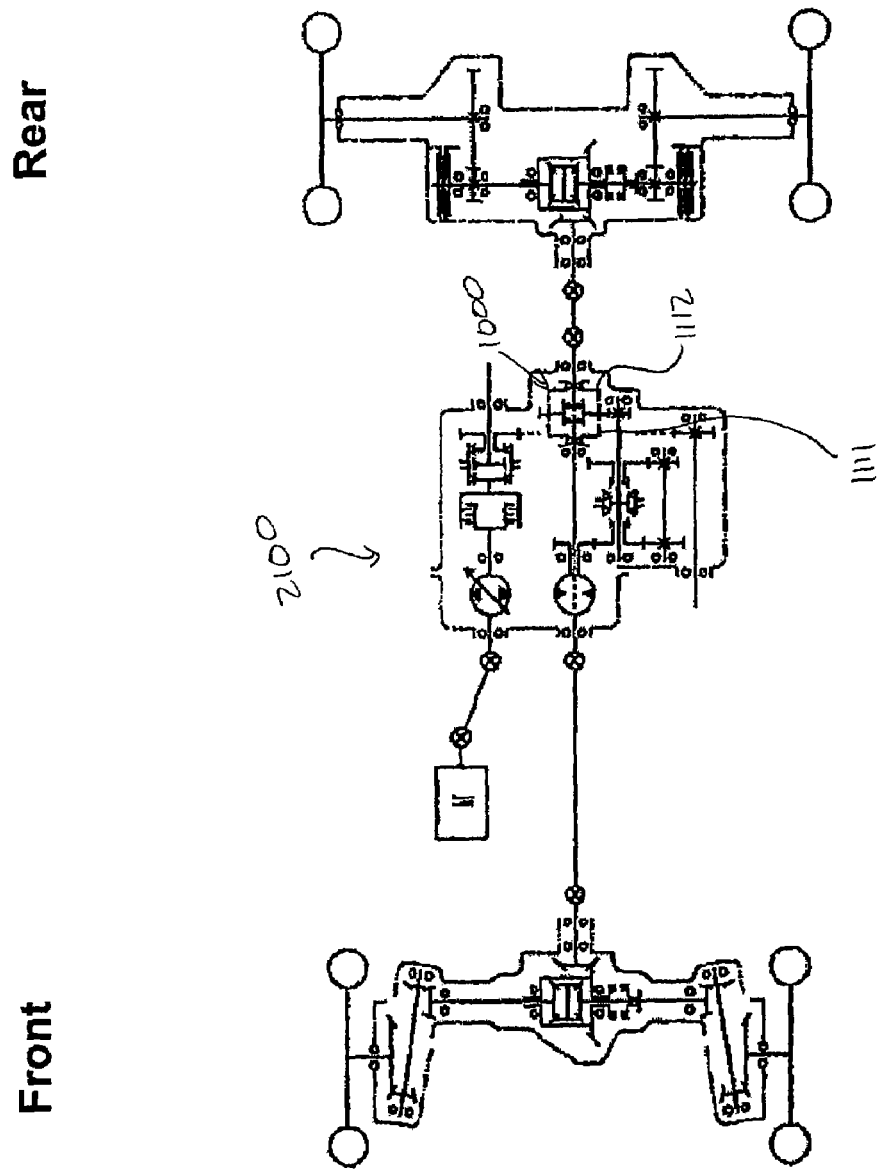

FIG. 21 is a schematic view of a four-wheel drive system configuration 2100. Configuration 2100 is identical to configuration 1500, with the exception that bi-directional overrunning clutch 1000 includes forward and rearward clutch sliders 1111, 1112.

Figure 22:
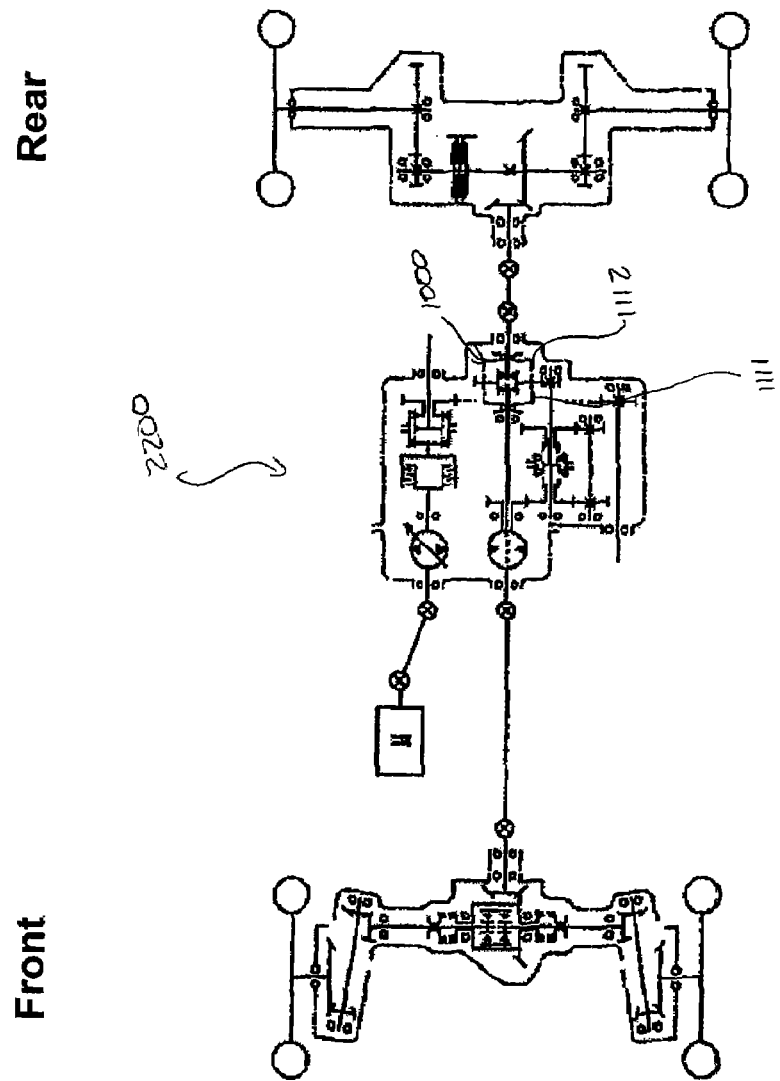

FIG. 22 is a schematic view of a four-wheel drive system configuration 2200. Configuration 2200 is identical to configuration 1600, with the exception that bi-directional overrunning clutch 1000 includes forward and rearward clutch sliders 1111, 1112.

Figure 23:
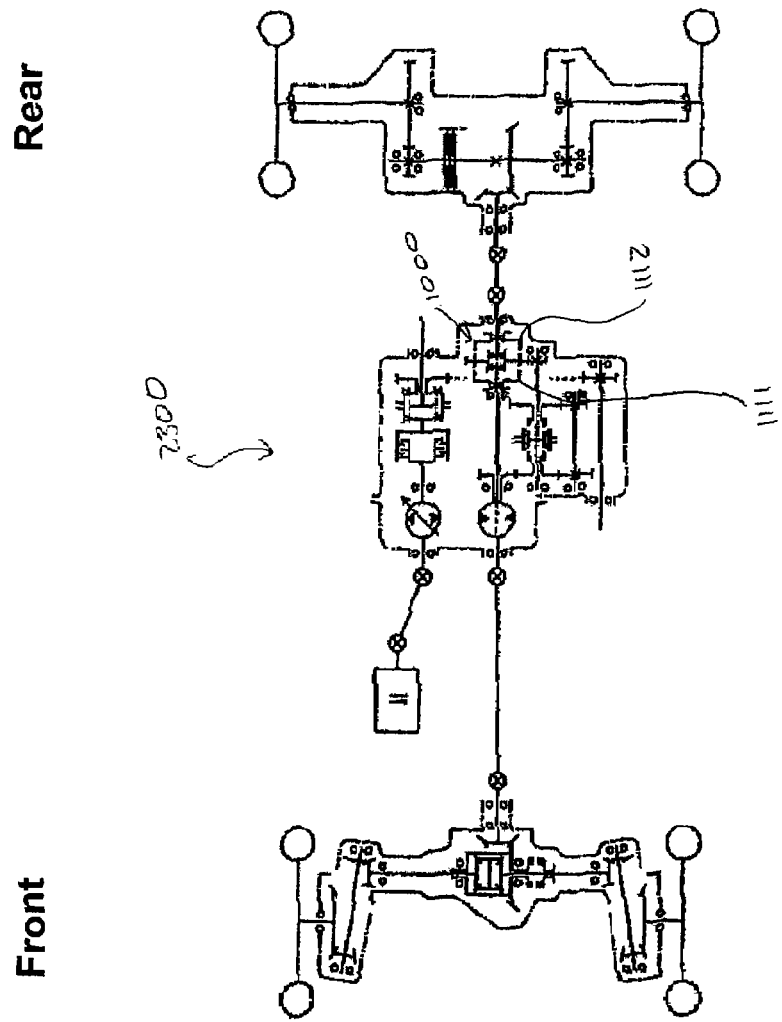

FIG. 23 is a schematic view of a four-wheel drive system configuration 2300. Configuration 2300 is identical to configuration 1700, with the exception that bi-directional overrunning clutch 1000 includes forward and rearward clutch sliders 1111, 1112.

Figure 24:
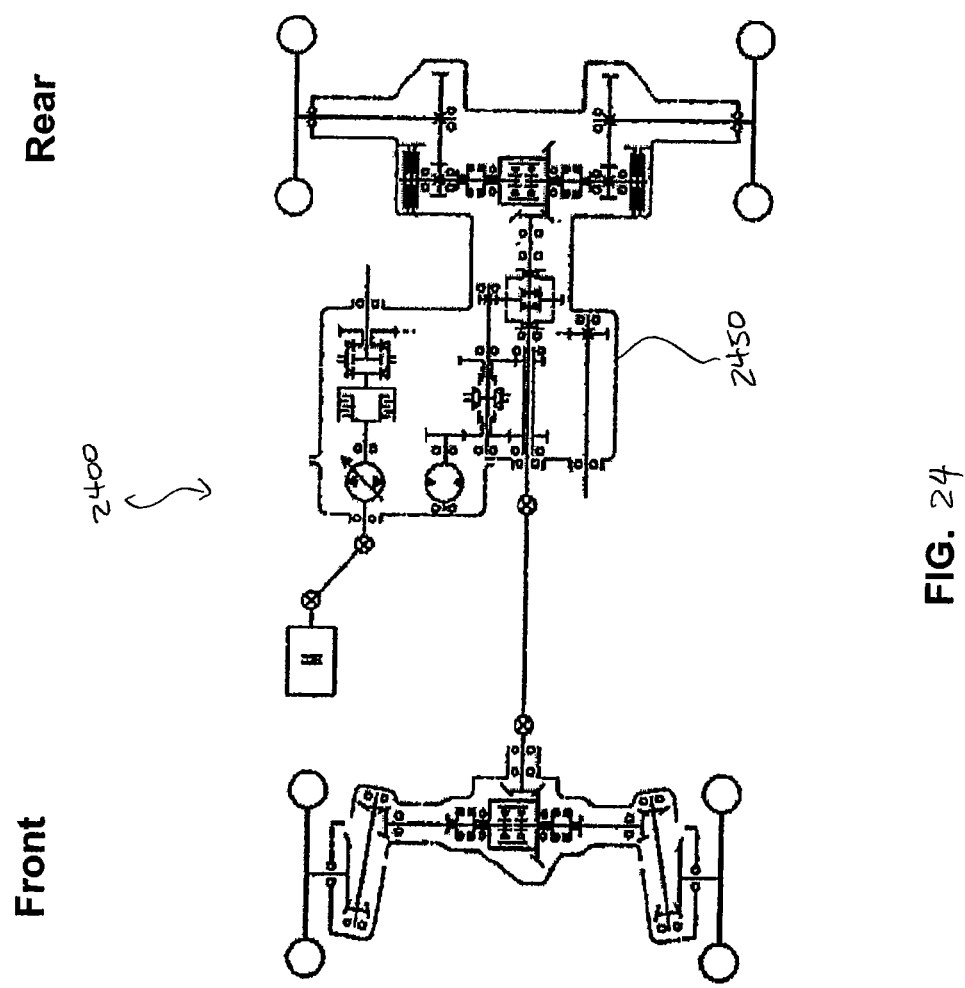

FIG. 24 is a schematic view of a four-wheel drive system configuration 2400. Configuration 2400 is similar to configuration 1800, with the exception that the central transaxle and rear transaxle are disposed within one integral housing 2450.

Figure 25:
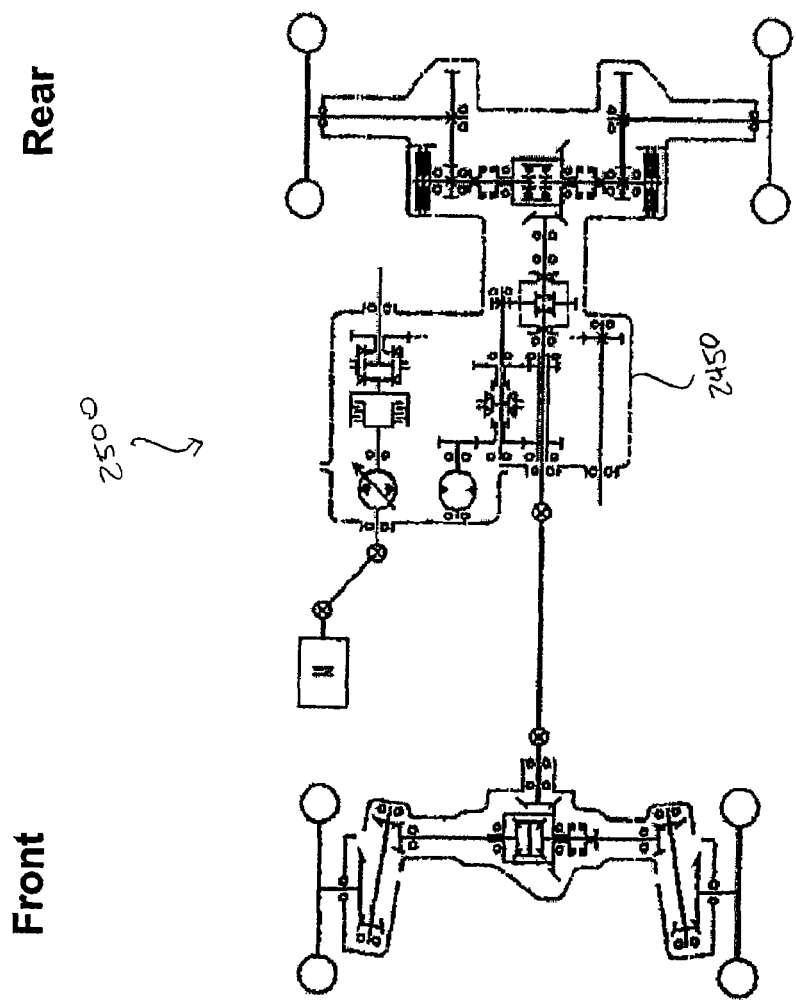

FIG. 25 is a schematic view of a four-wheel drive system configuration 2500. Configuration 2500 is similar to configuration 1900, with the exception that the central transaxle and rear transaxle are disposed within one integral housing 2450.

Figure 26:
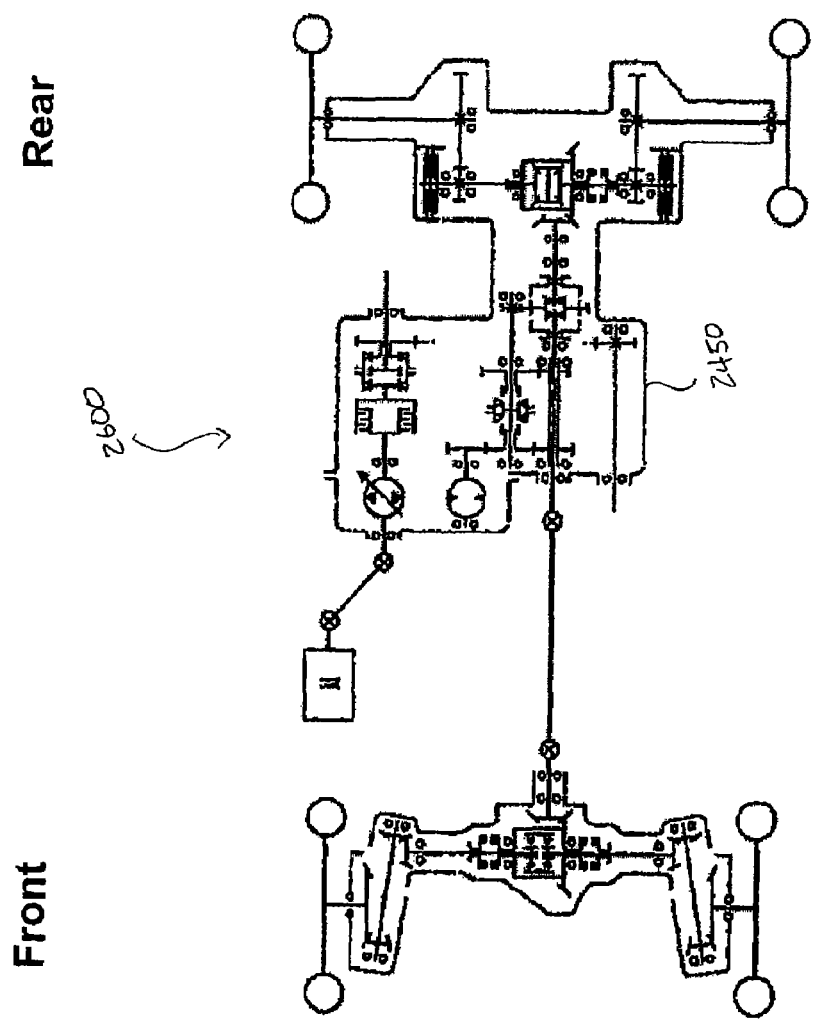

FIG. 26 is a schematic view of a four-wheel drive system configuration 2600. Configuration 2600 is similar to configuration 2000, with the exception that the central transaxle and rear transaxle are disposed within one integral housing 2450.

Figure 27:
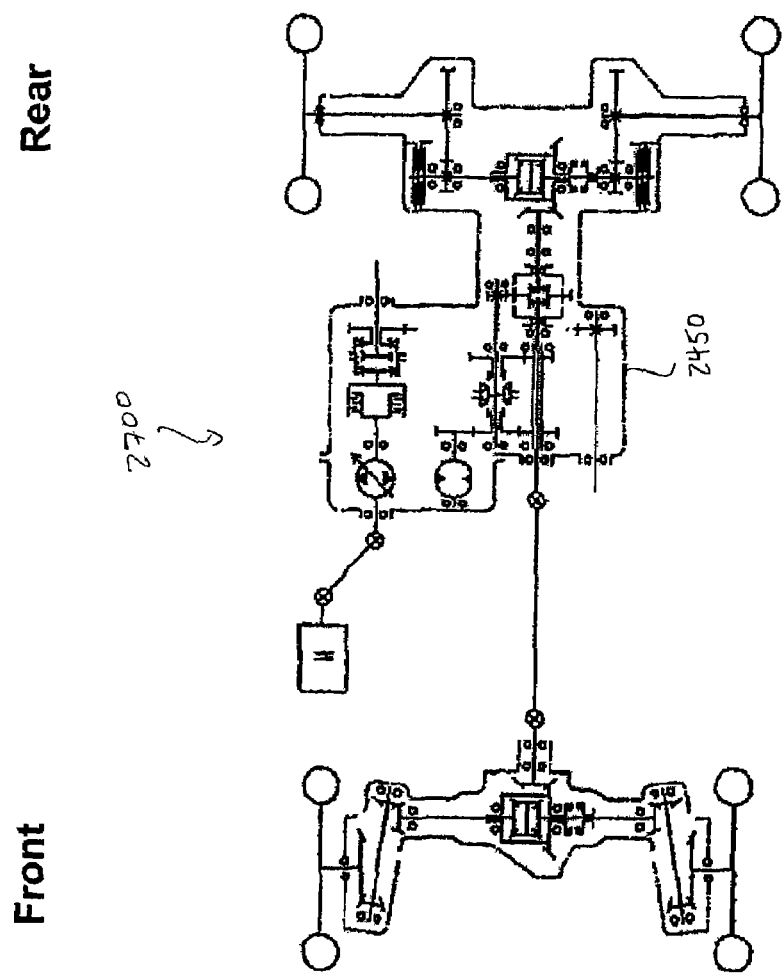

FIG. 27 is a schematic view of a four-wheel drive system configuration 2700. Configuration 2700 is similar to configuration 2100, with the exception that the central transaxle and rear transaxle are disposed within one integral housing 2450.

Figure 28:
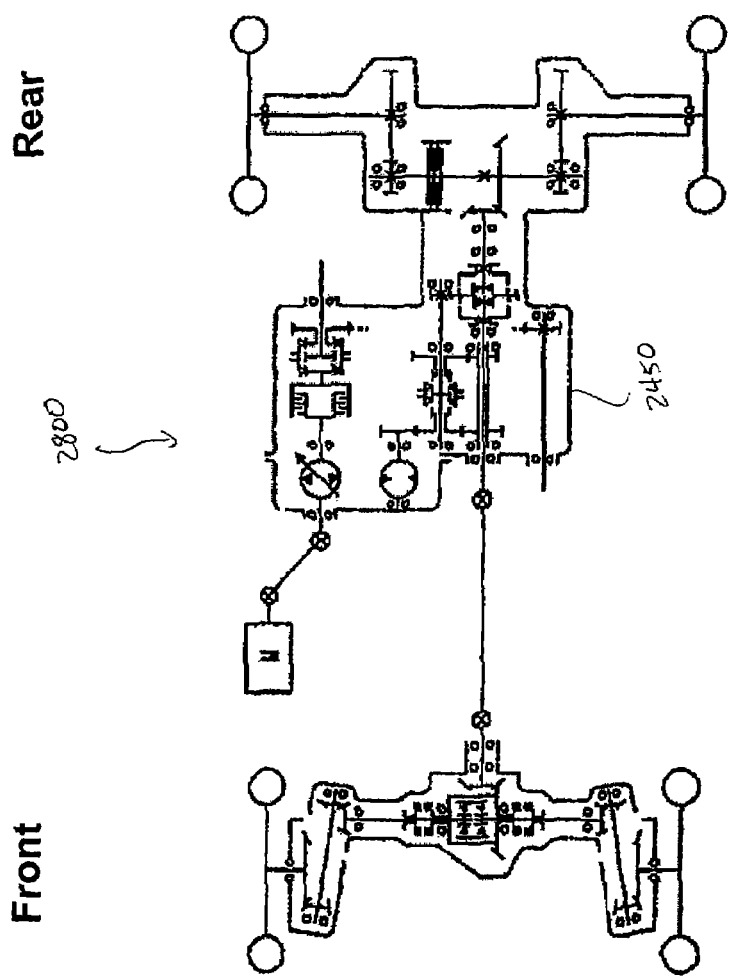

FIG. 28 is a schematic view of a four-wheel drive system configuration 2800. Configuration 2800 is similar to configuration 2200, with the exception that the central transaxle and rear transaxle are disposed within one integral housing 2450.

Figure 29:
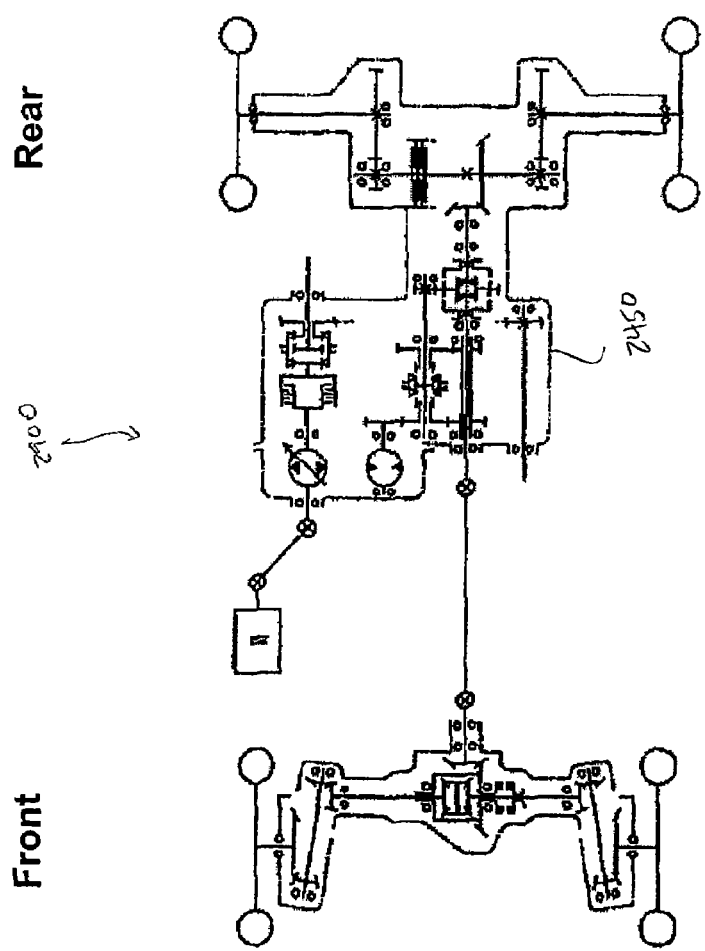

FIG. 29 is a schematic view of a four-wheel drive system configuration 2900. Configuration 2900 is similar to configuration 2300, with the exception that the central transaxle and rear transaxle are disposed within one integral housing 2450.

Figure 30:
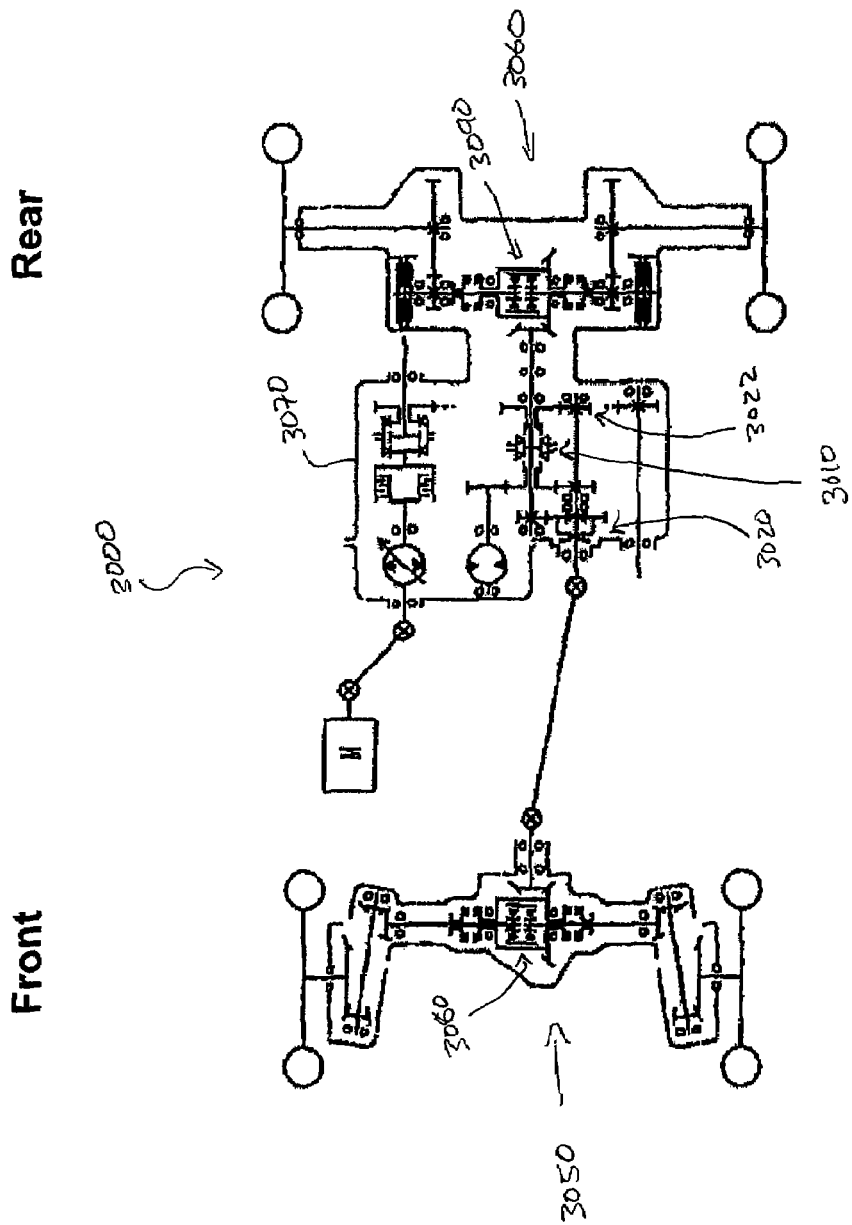

FIG. 30 is a schematic view of a four-wheel drive system configuration 3000. Configuration 3000 differs from the previously described configurations in that a central bi-directional overrunning clutch is not included in the central transaxle. Instead clutch components 3020 and 3022 are used to transmit rotary motion from speed change unit 3010 to front and rear transaxles 3050 and 3060, respectively. Further, the central transaxle and rear transaxle components are all disposed within one integral housing 3070.

Otherwise, configuration 3000 includes a bi-directional overrunning clutch 3080 in the front transaxle 3050 and a bi-directional overrunning clutch 3090 in the rear transaxle 3060, similar to the configuration 1200.

Figure 31:
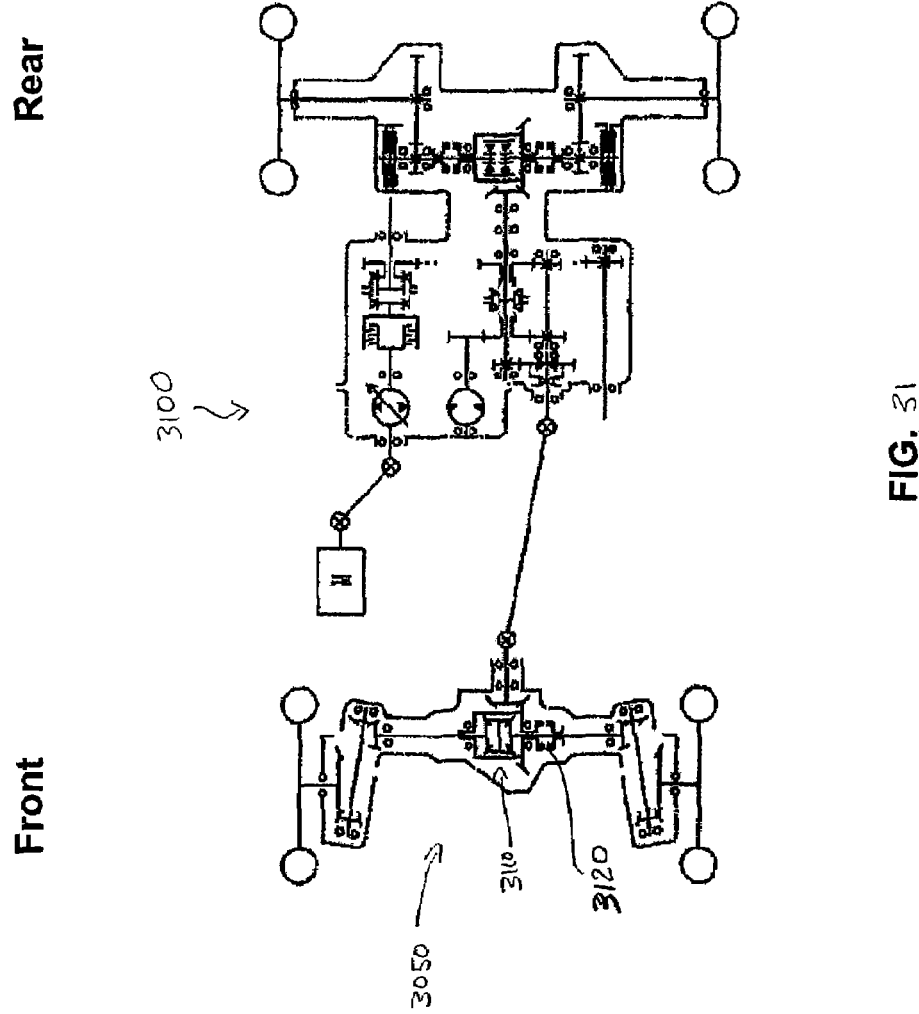

FIG. 31 is a schematic view of a four-wheel drive system configuration 3100. Configuration 3100 is identical to configuration 3000, with the exception that bi-directional overrunning clutch 3080 in the front transaxle 3050 is exchanged for a standard differential unit 3110 with a standard differential lock 3120.

Figure 32:
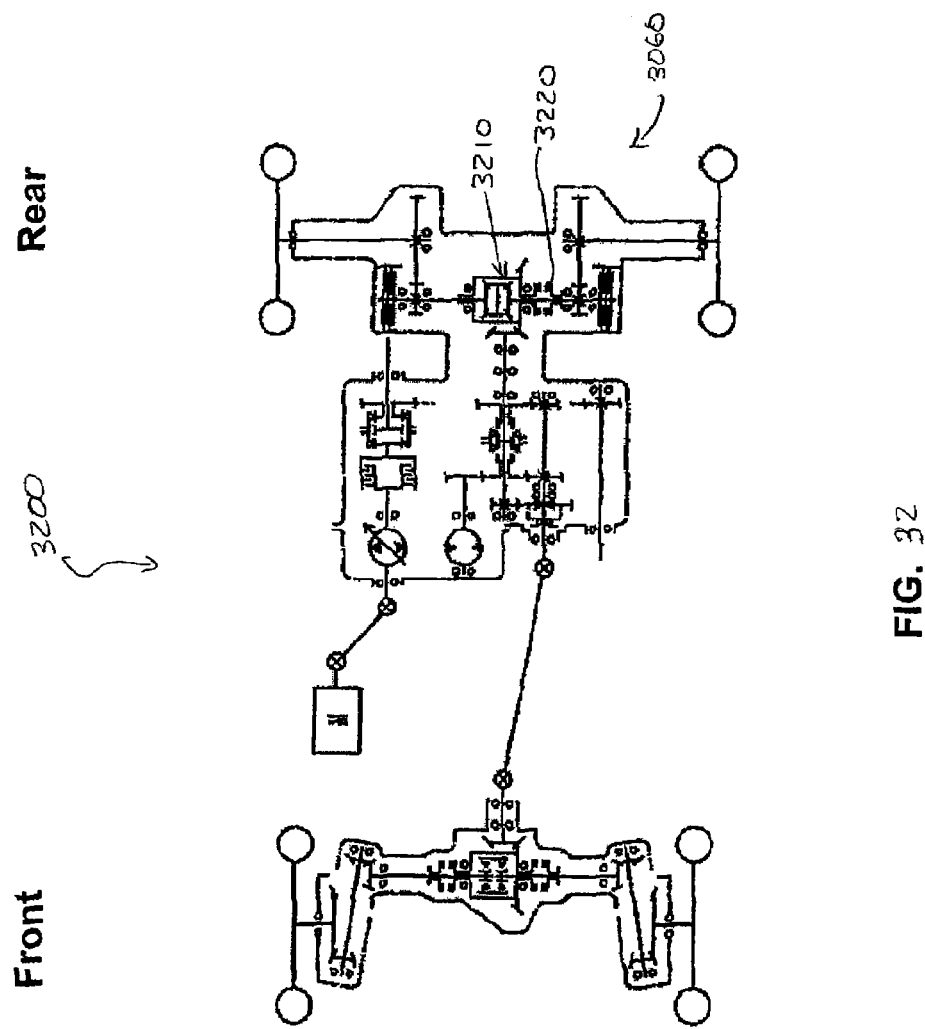

FIG. 32 is a schematic view of a four-wheel drive system configuration 3200. Configuration 3200 is identical to configuration 3000, with the exception that bi-directional overrunning clutch 3090 in the rear transaxle 3060 is exchanged for a standard differential unit 3210 with a standard differential lock 3220.

Figure 33:
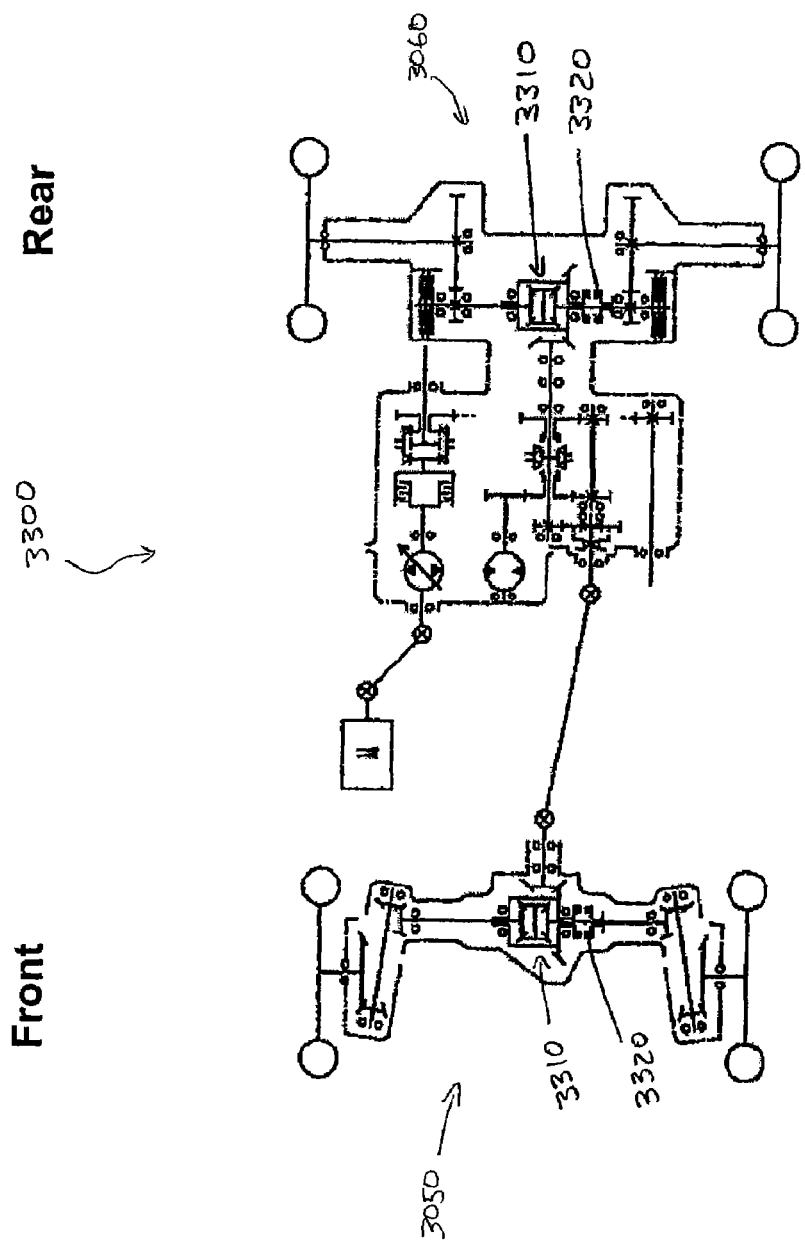

FIG. 33 is a schematic view of a four-wheel drive system configuration 3300. Configuration 3300 is identical to configuration 3000, with the exception that both bi-directional overrunning clutches 3080 and 3090 in the front and rear transaxles 3050 and 3060 are exchanged for standard differential units 3310 with standard differential locks 3320.

Figure 34:
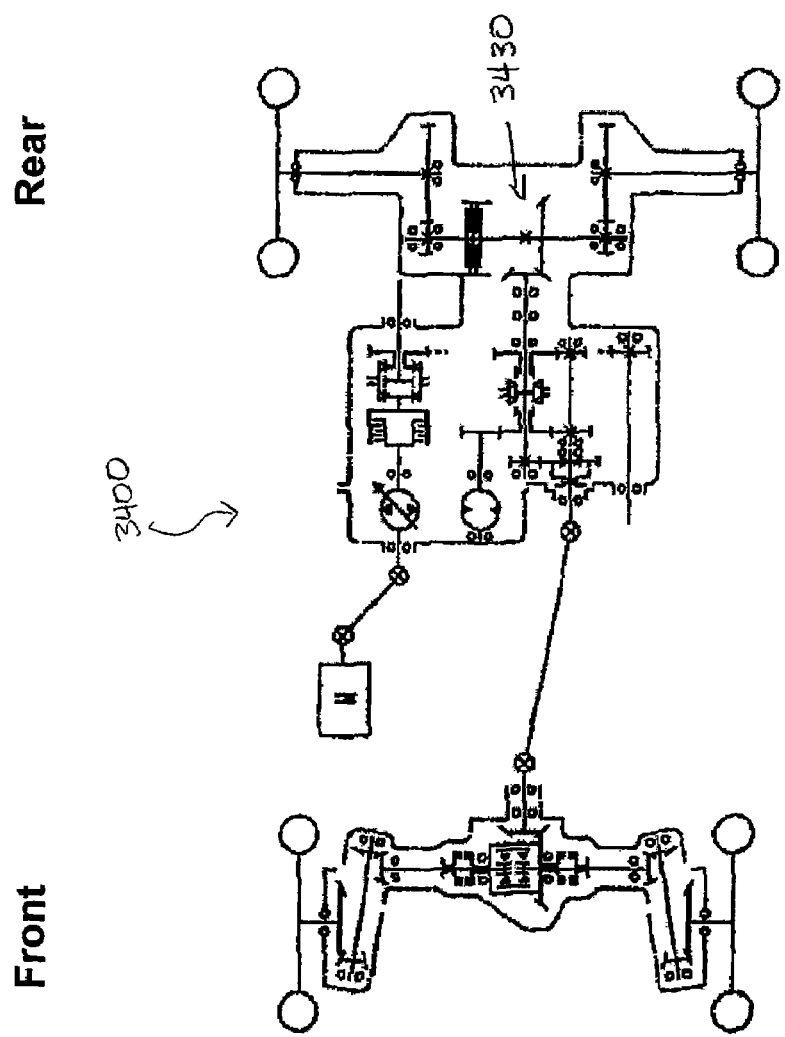

FIG. 34 is a schematic view of a four-wheel drive system configuration 3400. Configuration 3400 is identical to configuration 3000, with the exception that the rear transaxle 3430 does not include a bi-directional overrunning clutch.

Figure 35:
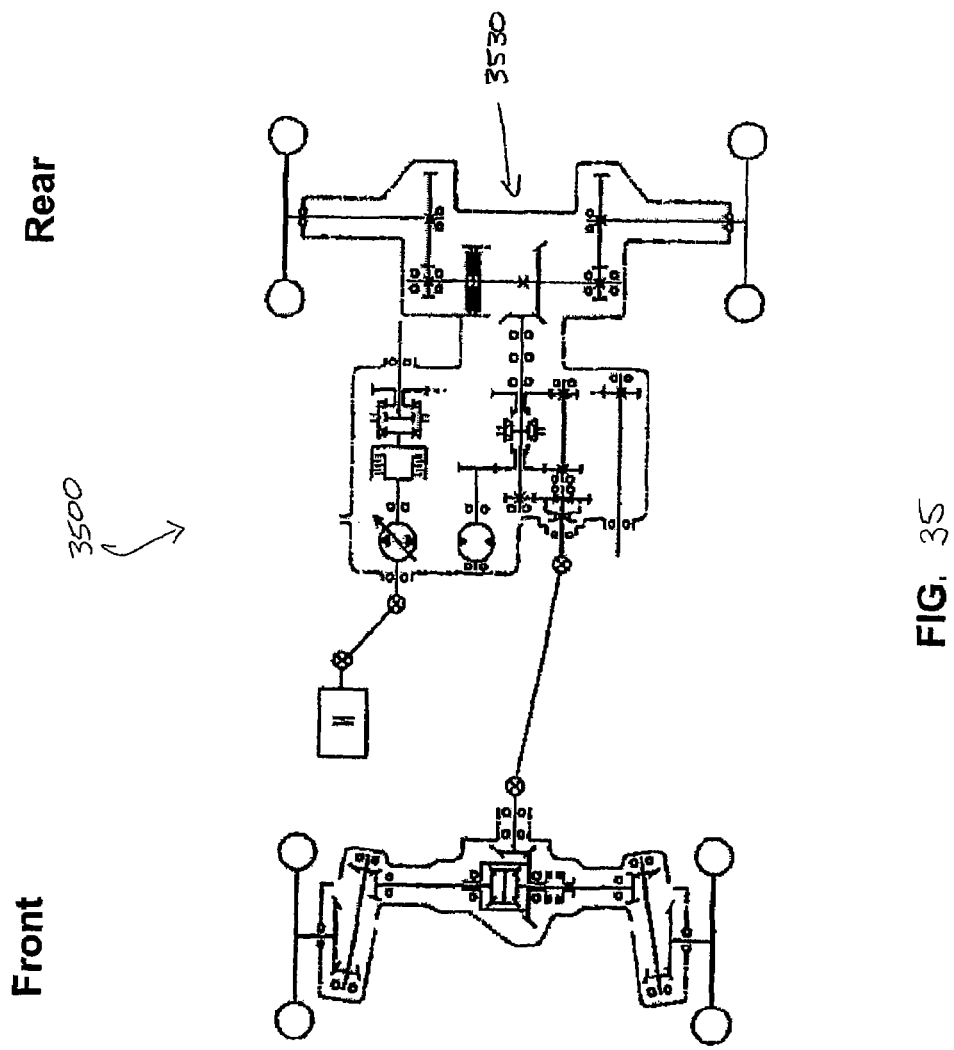

FIG. 35 is a schematic view of a four-wheel drive system configuration 3500. Configuration 3500 is identical to configuration 3100, with the exception that the rear transaxle 3530 does not include a bi-directional overrunning clutch.

While various embodiments of a bi-directional overrunning clutch have been described above, it should be understood that they have been presented by way of example and not limitation. The embodiments presented herein serve only to enable one of skill in the art to make and use the invention. The present invention should not be limited by any of the above described exemplary embodiments, but should be defined only in accordance with the following claims and their equivalents. All cited patent documents and publications in the above description are incorporated in their entirety herein by reference.

What is claimed is:

1. A four-wheel drive system comprising:
a front transaxle;
a rear transaxle;
a transmission receiving drive power from a prime mover, and having an output shaft; and
a bi-directional overrunning clutch drivingly coupled to the output shaft of the transmission and selectively coupled to the front transaxle and rear transaxle, wherein the bi-directional overrunning clutch includes,
an input gear drivingly coupled to the output shaft of the transmission,
a roller assembly, disposed within the input gear, including
a roll cage, and
a spring extending from the roll cage,
a first hub located at least partially within the roller assembly and selectively coupled with an end of a forward shaft segment, wherein the forward shaft segment delivers torque to the front transaxle, a second hub located at least partially within the roller assembly and coupled with an end of a rearward shaft segment, wherein the rearward shaft segment delivers torque to the rear transaxle, and a friction member disposed adjacent the roller assembly and at least one of the hubs, wherein the spring exerts a force on the friction member, thereby creating a frictional engagement between the roller assembly and the hub.

2. The four-wheel drive system of claim 1, wherein:

the roll cage is divided into two distinct roll cage segments, which are interlocked with one another in a loose-fitting engagement, each roll cage segment including a plurality of recesses;

the roller assembly further comprises a plurality of rollers disposed within the recesses of the roll cage segments; and each hub includes a plurality of detents that engage with the rollers.

3. The four-wheel drive system of claim 1, further comprising:

a clutch slider in splined engagement with the rearward shaft segment, wherein the clutch slider may be set in one of two settings, a first setting being a disengaged setting to allow the bi-directional overrunning clutch to perform its differential function of differentially transmitting torque to the rearward shaft segment, and a second setting being an engaged setting to lock the rearward shaft segment to the input gear and thereby cancel the differential function.

4. The four-wheel drive system of claim 1, further comprising:

a clutch slider disposed about the forward shaft segment, wherein the clutch slider may be set in one of three settings, a first setting being a disengaged setting to allow the bi-directional overrunning clutch to perform its differential function of differentially transmitting torque to the forward shaft segment, a second setting being an engaged setting to lock the forward shaft segment to the input gear and thereby cancel the differential function, and a third setting being a neutral setting which decouples the forward shaft segment from the bi-directional overrunning clutch, thereby preventing the transmission of torque from the bi-directional overrunning clutch to the forward shaft segment.

5. The four-wheel drive system of claim 1, further comprising a ball lock adjacent the spring so as to engage with one of a plurality of detents on one of the hubs.

6. The four-wheel drive system of claim 1, wherein the friction member is a friction plate.

7. The four-wheel drive system of claim 1, wherein the transmission and the bi-directional overrunning clutch are disposed within one integral housing.

8. The four-wheel drive system of claim 1, wherein the transmission, bi-directional overrunning clutch, and rear transaxle are all disposed within one integral housing.

9. The four-wheel drive system of claim 1, wherein the rear transaxle further comprises:

first and second axle shaft segments, and a second bi-directional overrunning clutch drivingly coupled to the first and second axle shaft segments, wherein the second bi-directional overrunning clutch includes, a second input gear drivingly coupled to the rearward shaft segment, a roller assembly, disposed within the input gear, including a roll cage, and a spring extending from the roll cage, a first hub located at least partially within the roller assembly and coupled with an end of the first axle shaft segment, a second hub located at least partially within the roller assembly and coupled with an end of the second axle shaft segment, and a friction member disposed adjacent the roller assembly and at least one of the hubs, wherein the spring exerts a force on the friction member, thereby creating a frictional engagement between the roller assembly and the hub.

10. The four-wheel drive system of claim 1, wherein the front transaxle further comprises:

first and second axle shaft segments, and a second bi-directional overrunning clutch drivingly coupled to the first and second axle shaft segments, wherein the second bi-directional overrunning clutch includes, a second input gear drivingly coupled to the forward shaft segment, a roller assembly, disposed within the input gear, including a roll cage, and a spring extending from the roll cage, a first hub located at least partially within the roller assembly and coupled with an end of the first axle shaft segment, a second hub located at least partially within the roller assembly and coupled with an end of the second axle shaft segment, and a friction member disposed adjacent the roller assembly and at least one of the hubs, wherein the spring exerts a force on the friction member, thereby creating a frictional engagement between the roller assembly and the hub.

11. A four-wheel drive system comprising:

a front transaxle;

a rear transaxle;

a transmission receiving drive power from a prime mover, and having an output shaft; and a bi-directional overrunning clutch drivingly coupled to the output shaft of the transmission and selectively coupled to the front transaxle and rear transaxle, wherein the bi-directional overrunning clutch includes, an input gear drivingly coupled to the output shaft of the transmission, a roller assembly, disposed within the input gear, including a roll cage, and a spring extending from the roll cage, a first hub located at least partially within the roller assembly and coupled with an end of a forward shaft segment, wherein the forward shaft segment delivers torque to the front transaxle, a second hub located at least partially within the roller assembly and selectively coupled with an end of a rearward shaft segment, wherein the rearward shaft segment delivers torque to the rear transaxle, and a friction member disposed adjacent the roller assembly and at least one of the hubs, wherein the spring exerts a force on the friction member, thereby creating a frictional engagement between the roller assembly and the hub.

12. The four-wheel drive system of claim 11, wherein:
the roll cage is divided into two distinct roll cage segments, which are interlocked with one another in a loose-fitting engagement, each roll cage segment including a plurality of recesses;
the roller assembly further comprises a plurality of rollers disposed within the recesses of the roll cage segments; and
each hub includes a plurality of detents that engage with the rollers.

13. The four-wheel drive system of claim 11, further comprising:
a clutch slider in splined engagement with the forward shaft segment, wherein the clutch slider may be set in one of two settings, a first setting being a disengaged setting to allow the bi-directional overrunning clutch to perform its differential function of differentially transmitting torque to the forward shaft segment, and a second setting being an engaged setting to lock the forward shaft segment to the input gear and thereby cancel the differential function.

14. The four-wheel drive system of claim 11, further comprising:
a clutch slider disposed about the rearward shaft segment, wherein the clutch slider may be set in one of three settings, a first setting being a disengaged setting to allow the bi-directional overrunning clutch to perform its differential function of differentially transmitting torque to the rearward shaft segment, a second setting being an engaged setting to lock the rearward shaft segment to the input gear and thereby cancel the differential function, and a third setting being a neutral setting which decouples the rearward shaft segment from the bi-directional overrunning clutch, thereby preventing the transmission of torque from the bi-directional overrunning clutch to the rearward shaft segment.

15. The four-wheel drive system of claim 11, further comprising a ball lock adjacent the spring so as to engage with one of a plurality of detents on one of the hubs.

16. The four-wheel drive system of claim 11, wherein the friction member is a friction plate.

17. The four-wheel drive system of claim 11, wherein the transmission and the bi-directional overrunning clutch are disposed within one integral housing.

18. The four-wheel drive system of claim 11, wherein the transmission, bi-directional overrunning clutch, and rear transaxle are all disposed within one integral housing.

19. The four-wheel drive system of claim 11, wherein the rear transaxle further comprises:
first and second axle shaft segments, and
a second bi-directional overrunning clutch drivingly coupled to the first and second axle shaft segments, wherein the second bi-directional overrunning clutch includes,
a second input gear drivingly coupled to the rearward shaft segment,
a roller assembly, disposed within the input gear, including
a roll cage, and
a spring extending from the roll cage,
a first hub located at least partially within the roller assembly and coupled with an end of the first axle shaft segment,
a second hub located at least partially within the roller assembly and coupled with an end of the second axle shaft segment, and
a friction member disposed adjacent the roller assembly and at least one of the hubs, wherein the spring exerts a force on the friction member, thereby creating a frictional engagement between the roller assembly and the hub.

20. The four-wheel drive system of claim 11, wherein the front transaxle further comprises:
first and second axle shaft segments, and
a second bi-directional overrunning clutch drivingly coupled to the first and second axle shaft segments, wherein the second bi-directional overrunning clutch includes,
a second input gear drivingly coupled to the forward shaft segment,
a roller assembly, disposed within the input gear, including
a roll cage, and
a spring extending from the roll cage,
a first hub located at least partially within the roller assembly and coupled with an end of the first axle shaft segment,
a second hub located at least partially within the roller assembly and coupled with an end of the second axle shaft segment, and
a friction member disposed adjacent the roller assembly and at least one of the hubs, wherein the spring exerts a force on the friction member, thereby creating a frictional engagement between the roller assembly and the hub.

* * * * *